(12) United States Patent
Asanovic et al.

(10) Patent No.: US 7,287,140 B1
(45) Date of Patent: Oct. 23, 2007

(54) SYSTEM AND TECHNIQUE FOR FINE-GRAINED COMPUTER MEMORY PROTECTION

(75) Inventors: Krste Asanovic, Cambridge, MA (US); Emmett J. Witchel, Austin, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 399 days.

(21) Appl. No.: 10/899,776

(22) Filed: Jul. 27, 2004

Related U.S. Application Data

(60) Provisional application No. 60/490,482, filed on Jul. 28, 2003.

(51) Int. Cl.
*G06F 12/14* (2006.01)

(52) U.S. Cl. .................. 711/163; 711/208; 726/27
(58) Field of Classification Search ................ 711/163, 711/208; 726/27
See application file for complete search history.

(56) References Cited

U.S. PATENT DOCUMENTS

| | | | |
|---|---|---|---|
| 5,390,310 A | 2/1995 | Welland | |
| 5,627,987 A | 5/1997 | Nozue et al. | |
| 5,845,129 A | 12/1998 | Wendorf et al. | |
| 5,890,189 A | 3/1999 | Nozue et al. | |
| 6,003,123 A | 12/1999 | Carter et al. | |
| 2003/0009638 A1* | 1/2003 | Sharma et al. | 711/145 |

OTHER PUBLICATIONS

Handy, Jim, The Cache Memory Book, 1998, Academic Press Inc., 2nd edition, pp. 156-157.*

Tanenbaum, Andrew S., Modern Operating Systems, 2001, Prentice-Hall Inc., 2nd edition, p. 645.*

Witchel; "Mondriaan Memory Protection;" thesis submitted to Massachusetts Institute of Technology; Feb. 2004; pp. 1-135.

Witchel et al.; "Mondriaan Memory Protection;" Jobtalk [slide] Presentation at University of Southern CA, Los Angeles; Mar. 6, 2003; 66 sheets.

Witchel et al.; "Mondrix: A Linus Kernel with Mondriian Memory Protection;" Operating Systems Design & Implementation, Sixth Symposium; Submitted May 26, 2004; 14 sheets.

Witchel et al.; "Mondrian Memory Protection for Single Address Space Operating Systems;" Architectural Support for Programming Languages and Operating Systems, International Conference; submitted Mar. 15, 2002; 26 sheets.

Witchel et al.; "Mondrian Memory Protection;" Architectural Support for Programing Languages and Operating Systems, International Conference; paper presented Oct. 5, 2002; 13 sheets.

(Continued)

*Primary Examiner*—Brian R. Peugh
*Assistant Examiner*—Jared I Rutz
(74) *Attorney, Agent, or Firm*—Daly, Crowley, Mofford & Durkee, LLP

(57) ABSTRACT

A fine-grained memory protection system and technique provide computer memory protection at least to a word granularity. A permissions table having permission values associated with a computer memory is arranged as protection domains. The permissions table can be cached in a protection lookaside buffer (PLD) and/or in sidecar registers. A software calls across protection domains (a cross-domain call) can be facilitated with a switch gate and a return gate. In some embodiments, a gate table is provided to store the switch gates and return gates, each having gate values. In some embodiments, a stack permission stable allows stack frames to be associated with the cross-domain call.

45 Claims, 17 Drawing Sheets

OTHER PUBLICATIONS

Witchel et al; "Mondrian Memory Protection;" Architectural Support for Programing Languages and Operating Systems, International Conference; slide presentation; Oct. 5, 2002; 34 sheets.

Witchel et al.; "Hardware Works, Software Doesn't: Enforcing Modularity with Mondriaan Memory Protection;" Hot Topics in Operating Systems Workshop; paper submitted Jan. 10, 2003; 6 sheets.

Witchel et al.; "Hardware Works, Software Doesn't: Enforcing Modulartiy with Mondriaan Memory Protection;" Hot Topics in Operating Systems Workshop; presented May 18, 2003; 6 sheets.

Witchel et al.; "Hardware Works, Software Doesn't: Enforcing Modulartiy with Mondriaan Memory Protection;" Hot Topics in Operating Systems Workshop; slides presented May 18, 2003; 29 sheets.

Witchel et al.; "Hardware Works, Software Doesn't: Enforcing Modulartiy with Mondriaan Memory Protection;" Hot Topics in Operating Systems Workshop; Jun. 17, 2003.

Introduction to Throughput Computing: Sun Microsystems: 2003; 18 pages.

* cited by examiner

SYSTEM AND TECHNIQUE FOR FINE-GRAINED COMPUTER MEMORY PROTECTION

CROSS REFERENCE TO RELATED APPLICATIONS

This application claims the benefit under 35 U.S.C. § 119(e) of U.S. Provisional Application No. 60/490,482 filed Jul. 28, 2003, which application is incorporated herein by reference in its entirety.

STATEMENT REGARDING FEDERALLY SPONSORED RESEARCH

This invention was made with government support under Contract No. F30602-00-2-0562 awarded by the Defense Advanced Research Projects Agency (DARPA) and Contract No. CCR-0093354 awarded by the National Science Foundation (NSF). The government has certain rights in the invention.

FIELD OF THE INVENTION

This invention relates generally to computer memory protection, and, more particularly, to a system and technique that can provide memory protection to a fine granularity of computer memory.

BACKGROUND OF THE INVENTION

Computers are known to crash and/or otherwise malfunction. Often, the crash or malfunction is associated with a running computer program that corrupts a memory area in the computer's random access memory (RAM) used by another running program. Such corruption may be caused, for example, by one computer program overwriting a memory area used by another computer program. Such corruption can also be caused by malicious software, for example, a computer virus. In order to reduce the potential for memory conflicts and resulting corruption, certain conventional protection mechanisms described below, can limit the ability of a computer program to corrupt a portion of the RAM used by another computer program.

Even though it may be desirable to protect a memory area used by a computer program from corruption by another computer program, it is often advantageous for computer programs or processes to share data stored in the computer RAM memory. In some conventional computer environments, sharing is provided by copying the contents of a memory region used by a computer program to another region of RAM, which is then used by another computer program. While such copying protects the original memory region from corruption by the other computer program, the copying process is relatively slow, resulting in slow computer operation.

Conventional commercially available computer operating systems (OSs) typically provide protection of memory portions among different program processes, and between all user processes and trusted memory supervisor code. In addition, conventional operating systems typically support flexible sharing of data in computer RAM memory to allow software applications to cooperate efficiently.

Conventional computer architectures and operating systems provide a linear addressing scheme, in which each software process has a separate linear demand-paged virtual address space. Each address space has a single protection domain that defines protections to memory in the address space, shared by all threads that run within the process. With this arrangement, a software thread can only have a different protection domain if it runs in a different address space. With this arrangement, sharing is only possibly at page granularity, where a single physical memory page can be mapped into two or more virtual address spaces. A page in computer memory has a size that is typically on the order of four kilobytes. Therefore, with this arrangement, protected sharing has a relatively coarse granularity of four kilobytes.

Although the above-described addressing scheme is now common in OS designs and hardware implementations, it has significant disadvantages when used for protected sharing of memory spaces. For example, pointer-based data structures can be shared only if the shared memory region resides at the same virtual address for all participating processes. Also, all words within a page must have the same permissions. As described above, a conventional memory page has a size in the vicinity of four kilobytes, which provides memory protection regions having only a coarse memory permission granularity. Furthermore, interpretation of a pointer depends on addressing context, and any transfer of control between software modules requires a time-consuming context switch, for example, with a software call to another software module. The coarse granularity of protection regions, the time consuming overhead of providing protected memory via software calls, and the time consuming overhead of inter-process communication limits the ways in which conventional protected sharing can be used by software applications.

Although software designers are creative in working around the above limitations to implement protected memory sharing for some software applications, each software application requires considerable custom engineering effort to attain high performance.

In some cases, such as web browsers or kernel modules, software designers sacrifice memory protection robustness in favor of performance, e.g., processing speed, by foregoing hardware memory protection and placing all software modules in the same address space. It should be apparent that this arrangement can lead to computer crashes as software modules compete for the same memory space.

In contrast to systems that place all software modules in the same address space, to provide memory protection, some conventional computer architectures and operating systems, e.g., Linux on x86 or Windows XP on x86, associate each software process with its own memory address space. However, such systems can have increased complexity and run-time overhead, as described above, from managing multiple address contexts.

Some software systems benefit from an ability to provide extensibility, wherein new software modules (sometimes referred to as "plug-ins") can be linked to existing software modules to provide enhanced functionality. Architects of these systems generally do not use conventional operating system protection support, which, as described above, provides a separate address space for each software module. Instead, the plug-in occupies the same memory space as the program to which it is linked, providing good processing speed at the expense of potential memory corruption. For example, the Apache web server has a plug-in for the interpretation of perl code in web pages. For another example, browsers can receive plug-ins to interpret portable document format (PDF) documents, a format provided by software from ADOBE® Systems Incorporated, San Jose, Calif. Linking a plug-in to an existing computer program makes communication between the computer program and the plug-in fast and flexible, but because there is no protection between the plug-in and the software program to which it is linked in the same address space, the linkage can lead to memory corruption, or open a security hole in a server (e.g., from a buffer overrun).

Embedded systems, e.g., systems having microcontrollers with embedded code, can have similar problems. Embedded systems are often organized having a set of tasks (sometimes including an operating system) that share physically addressed memory. Without inter-task memory protection, an error in part of the embedded system can make the entire embedded system unreliable. Similarly, loadable OS kernel modules (such as in Linux) all run in the kernel's unprotected address space, leading to potential reliability and security problems.

As described above, so-called "demand-paged virtual memory systems," in order to provide multiple protection domains, can place each thread in a separate address space and then map physical memory pages to the same virtual address in each address context. These systems have a coarse protection granularity only to the memory page level.

So called "page-group systems," such as HP-PA RISC and PowerPC, partition memory protection domains according to which page-groups (collections of memory pages) are accessible. Every protection domain that has access to a page-group sees the same permissions for all pages in the group. Page-group systems have coarse granularity corresponding to a page or multiple pages.

So called "domain-page systems" have an explicit protection domain identifier, and each protection domain can specify a permission value for each page. Permissions are managed only at page granularity.

So-called "capability systems" are an extension of segmented architectures where a "capability" is a special pointer that contains both location and protection information for a segment of memory. Although designed for protected sharing, capability systems do not function well for the common case of shared data structures that contain pointers. Capability systems do not support multiple memory protection domains, since threads sharing the data structure use its pointers (capabilities) and therefore see the same permissions for objects accessed via the shared structure. Also, many capability systems provide a relatively poor ability to revoke protection permissions, and, in order to revoke permissions, require an exhaustive sweep of the memory. Some capability systems perform an indirect lookup on each capability use, which adds considerable run-time overhead.

SUMMARY OF THE INVENTION

In accordance with the present invention, a method for providing fine-grained protection of contents of a computer memory used in a computer includes selecting a range of memory addresses within the computer memory and associating each word in the range of memory addresses with a respective metadata value, wherein a selected word in the range of memory addresses is associated with a first metadata value and words adjacent to the selected word are associated with second and third metadata values respectively.

In accordance with another aspect of the present invention, a computer apparatus having a central processing unit (CPU) includes a computer memory having a range of memory addresses addressable by the CPU and a permissions table associated with the computer memory for associating each word in the range of memory addresses with a respective metadata value, wherein a selected word in the range of memory addresses is associated with a first metadata value and words adjacent to the selected word are associated with second and third metadata values respectively.

In one particular embodiment, for both the above method and system, each metadata value is selected from among a read-only value, a write-only value, a read-write value, an execute-read value, an execute-write value, an execute-read-write value, an execute-only value, and a no-permission value, and can further comprise at least one of a cache coherence state value, a not-cached state value, a cached-exclusive state value, a cached-modified state value, and a cached-shared state value.

With these particular arrangements, memory protection can be provided at a granularity of one word.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the system and technique for fine-grained computer memory protection, some introductory concepts and terminology are explained. The term "block" is used herein to describe an address range in computer memory that is aligned on a power-of-two address boundary, and which has a size that is a power-of-two.

The term "segment," as used herein, describes any bounded portion of computer memory, which may or may not align on a power-of-two address boundary, and which may or may not have a size which is a power-of-two.

As is known, a computer has a largest addressable memory space often referred to as a virtual memory. Often, the physical memory associated with the computer has a size less than the virtual memory size. Therefore, the computer often has a mapping or a translation from a virtual memory space to a physical memory space.

As used herein, the term "function" or "software function" applies to a portion of operational software code that can be called within a software program. In some instances software functions identified below are conventional, e.g., the function malloc used in C code. In other instances non-conventional software functions used in the system and technique of the present invention are identified by name below. It should, however, be appreciated that names given below to particular functions associated with the system and technique of the present invention are illustrative only, and that other names could equally well be used.

The term "frame" or "activation frame," as used herein, refers to a portion of a memory stack currently being used.

Figure 1:
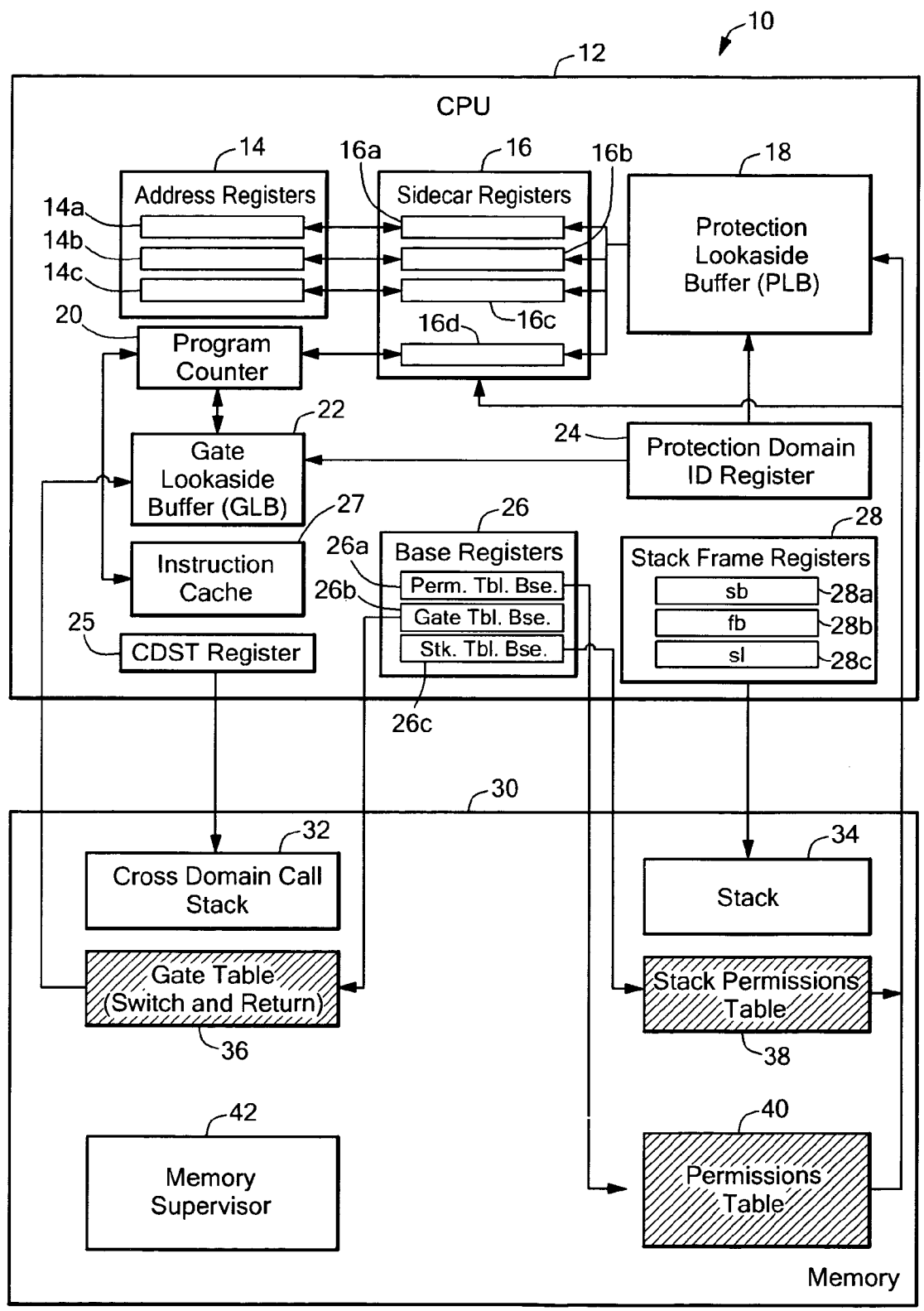
FIG. 1 is a block diagram of a computer system adapted to provide fine-grained memory protection.

Referring now to FIG. 1, a system 10 for computer memory protection includes a central processing unit (CPU) 12 coupled to a memory 30. The memory 30 includes a permissions table 40 stored in a privileged space of the memory 30. The permissions table 40 holds metadata values arranged as "protection domains." Protection domains are described more fully in conjunction with FIGS. 2 and 13 below. Metadata values stored in the permissions table 40 can each include, but are not limited to, a respective permission value. Exemplary permission values are shown in Table 1 below. Permission values can include, but are not limited to, a read-only value, a write-only value, a read-write value, an execute-read value, an execute-write value, an execute-read-write value, an execute-only value, and a no-permission value. The no-permissions value corresponds to no access rights. The metadata values stored in the permissions table 40 can also include other respective information, for example, a cache coherence state value, a not-cached state value, a cached-exclusive state value, a cached-modified state value, and a cached-shared state value.

TABLE 1

| Perm Value | Type |
|---|---|
| 00 | no perm |
| 01 | read-only |
| 10 | read-write |
| 11 | execute-read |

As used herein, the term permissions table is used to refer to both the physical portion of the memory 30 that holds the metadata values, and also to a data structure used to hold the metadata values. There are a variety of alternative data structures in which the metadata values can be stored in the permissions table 40. The data structure within the permissions table 40 can be selected to optimize a variety of factors, including but not limited to, memory space overhead, access time, utilization by a permission lookaside buffer (PLB) 18 more fully described below, and a time required to modify the permissions table 40 when permissions change. Exemplary data structures that describe the permissions table are shown in FIGS. 3-9 below.

The permissions table 40 holds addresses associated with the memory 30 and metadata values (including a permission value) associated with each address, all arranged as protection domains. Each protection domain encompasses a range of memory addresses, which can be a full range of virtual memory addresses, or which can be a full range of physical memory addresses. However, in other embodiments, the protection domains are associated with less than the full range of virtual and/or physical memory addresses. Each protection domain has one or more segments, each segment spanning a portion of the range of memory addresses, and each segment having particular metadata values including a particular permission value so that each memory address associated with the segment has the same permission value. Each protection domain provides permission values assigned to each word in the range of memory addresses, and the permission values can be different for different protection domains. It should be understood that permission values are associated with individual words in the range of memory addresses, and each word can have a different permission value. Protection domains are discussed in more detail in conjunction with FIGS. 2 and 14.

In some embodiments of the present invention, all segments are blocks. However, in other embodiments, some or all of the segments are not blocks.

In one particular embodiment, the memory 30 can be comprised of a variety of types of memory, including but not limited to, one or more of a dynamic random access memory (DRAM), a static random access memory (SRAM), a hard disk, a flash memory, a floppy disk, and a peripheral memory, for example an external digital tape recorder.

A protection lookaside buffer (PLB) 18 holds information associated with one or more protection domains, (i.e., addresses and associated metadata values) provided by the permissions table 40. In one particular embodiment, the PLB 18 is located within static random access memory, for example, within a cache memory having fast access speed to the CPU 12.

In one particular embodiment, the PLB 18 holds power-of-two blocks associated with the one or more protection domains. However, in other embodiments, the PLB 30 holds non-power-of-two segments associated with the one or more protection domains.

The PLB 18 can cache recently used memory addresses and associated permission values, avoiding long searches through the permissions table 40. The PLB 18 can be re-filled from the permissions table 40 using either hardware or software. Entries in the PLB 18 include one or more protection domains and can also include protection domain identifiers to identify each of the one or more protection domains stored within the PLB 18.

The CPU 12 includes address registers 14, here shown as three address registers 14a, 14b, 14c, each associated with a respective sidecar register 16a, 16b, 16c. The sidecar registers 16 are described in more detail in conjunction with FIG. 10. Let is suffice here to say that a sidecar registers holds information obtained from the PLB 18, and/or from the permissions table 40 which can include respective permission values (or, more generally, metadata values) associated with address ranges that can be associated with addresses held in the address registers 14a, 14b, 14c. A sidecar register 16d is also associated with a program counter 20, allowing an instruction within the program counter 20, associated with an address in the memory 30, to have rapid access to associated permission values.

Each sidecar register 16a-16c can cache a base, a bounds, and permission values for the last segment within a protection domain accessed by a corresponding address register 14a-14c. When an address within an address register 14a-14c or within the program counter 20 results in a sidecar register miss, i.e., an address not found in the range of the corresponding sidecar register, one or more of the sidecar registers 16a-16d can re re-loaded from the PLB 18. If the sidecar register cannot be re-loaded from the PLB 18, the PLB 18 can be reloaded from the permissions table 40 and the sidecar registers 16 can then be re-loaded from the PLB 18 or directly from the permissions table 40. Like entries in the PLB 18, the entries in the sidecar registers 16 can be tagged with a protection domain identifier.

The sidecar registers 16 can improve performance since they hold permission values corresponding to a segment along with segment address bounds, unlike the PLB 18, which, in one particular embodiment, has a segment boundary index limited to a power-of-two, e.g., a block.

A protection domain identifier (ID) register 24 holds a protection domain identifier value identifying a protection domain currently being used by the CPU 12. The protection domain identifier (ID) register 24 points to the protection domain currently being used, and which has corresponding information in the PLB 18 and in the sidecar registers 16.

The protection domain identifier (ID) register 24 can also hold information to distinguish a kernel mode from a user mode. Kernel mode enables access to privileged control registers (not shown) and privileged instructions.

In one particular embodiment, a particular protection domain identified by the protection domain identifier (ID) register 24, for example, protection domain 0, can have permission values that allow a software portion using protection domain 0 to manage other protection domains, e.g., to have full privileges throughout the range of memory addresses.

Base registers 26 include a permissions table base register 26a holding an address within the permissions table 40 corresponding to a base of the protection domain currently being used.

The memory 30 also includes a stack memory 30 and a stack permissions table 38. The stack permissions table 38 holds stack permission values, e.g., permission values as in Table 1, each associated with a particular range of addresses within the stack memory 34, unlike the permission values held in the permissions table 40 which are each associated with a segment within the larger full range of memory addresses of the memory 30. A stack table base register 26c holds an address corresponding to the portion of the stack permissions table 38 currently being used. With this arrangement, the stack memory 34 can be managed to have permission values associated with particular ranges of addresses within the stack memory 34.

Stack permissions within the stack permissions table 38 must be treated differently from regular memory permissions within the permission table 40. Stacks are used by threads that move between protection domains, and should not be accessible to other threads in the same protection domain. The stack permissions table 38 provides fine-grain stack permissions, i.e., which can be different on each word of the stack memory 34, and can have access permissions only visible to the owning thread, i.e., "thread-local" permissions.

Two forms of thread-local stack permissions can be maintained. In a first type, stack frame registers 28 designate a current stack frame as read-writeable and previous stack frames as read-only. In a second type, the stack permissions table 38 allows individual words of the stack frames to be made thread-writeable to support existing calling conventions with parameters that point to stack-allocated data structures.

The stack frame registers 28 partition the stack memory 34 into two regions: a read-only region between an addresses held in an sb (stack base) register 28a and in an fb (frame base) register 28b, and a read-write region between addresses held in the fb register 28b and an sl (stack limit) register 28c. Calls from one software portion to another software portion using another protection domain, a so-called "cross-domain call," grows the read-only region of the stack memory 34 by saving the current value of the fb register 28b and moving the current stack pointer into the fb register 28b. For example, in an x86 architecture, this operation is equivalent to moving "esp" into the fb register 28b. The cross-domain call is described more fully below in conjunction with FIGS. 10-10C.

The stack frame registers 28 allow fast creation of an activation frame on a cross-domain call and provide an efficient mechanism for read-only stack parameters. To support stack-allocated return parameters, the thread-local stack permissions table 38 encodes whether a given stack address is read-writable by the thread, for example, using one bit per word. The contents of the stack permissions table 38 can be cached in the PLB 18 along with information from the permissions table 40. A location in the stack memory 34 is read-writable if it lies between the read-only and read-write register addresses (i.e., between fb 28b and sl 28c), or if its stack write permissions bit is set as indicated in the stack permissions table 38.

A memory supervisor 42, described more fully below in conjunction with FIG. 13, can flush stack permissions information from the PLB 18 when a thread is de-scheduled. The computer system implementation does not restrict permissions on stack-allocated data structures. Every protection domain has read-write permissions to the kernel stacks.

Program instructions can be associated with "gate information," including, but not limited to a switch gate, and a return gate. The switch gate can, for example, be associated with a software call instruction and can identify an address and a protection domain identifier (PD-ID) associated with a destination software portion to which the call instruction directs software flow. The return gate can, for example, be associated with a software return instruction and can identify an address and a PD-ID associated with a source software portion to which the return instruction returns software flow.

However, in another embodiment, the return gate does not identify the PD-ID associated with the source software portion, since it can be separately stored at the time of the software call. The gate information is described more fully in conjunction with FIG. 11 below, and function of the gates is described more fully in conjunction with FIGS. 10-10C.

The memory 30 can also include a gate table 36 having the above-described gate information. Entries in the gate table are described in more detail in conjunction with FIG. 11. The entries in the gate table 36 allow a running software program to switch protection domains upon a software call and return to the original protection domain upon returning from the software call. Base registers 26 include a gate table base register 26b holding an address within the gate table corresponding to a region of the gate table 36 currently being used.

A gate lookaside buffer (GLB) 22 holds a portion of the gate information contained in the gate table 36. In one particular embodiment, the GLB 22 is located within static random access memory, for example, in a cache memory having fast access speed to the CPU 12. If the GLB 22 does not contain requested gate information, for example, because a requested address is out of the range of the GLB 22, the GLB 22 can be re-loaded from the gate table 36.

It will be apparent that most program instructions are not associated with a switch gate or a return gate. It would not be desirable to check the GLB 22 and/or the gate table 36 each time a program instruction is encountered having no associated gate. Therefore, in one particular embodiment, as program instructions are encountered which have no associated gate, those instruction can be tagged, for example with a single "gate-present" bit; within an instruction cache 27. When an instruction having a clear gate-present bit, i.e., a no-gate program address, is subsequently retrieved from the instruction cache 27, it is not necessary to look in the GLB 22 or in the gate table 36 to identify a gate associated with the instruction.

A cross-domain call stack 32 allows an address (i.e., a return address) associated, for example, with a software call instruction to be stored along with an associated protection domain identifier upon a software call from a source software portion. Upon returning from the destination software portion, the protection domain identifier associated with the address can, therefore, be recalled from the cross-domain call stack 32. This operation is described more fully in conjunction with FIGS. 10-10C.

A cross-domain stack top (CDST) register 25 points to a top of the cross-domain call stack 32. In one particular embodiment, the cross-domain call stack 32 can be implemented, for example, with a combination of an on-chip top-of-stack buffer (e.g., within the CPU 12 of FIG. 1), along with the cross-domain call stack 32 within the memory 30.

In operation, every memory access during a software program is checked to see if the protection domain associated with the memory access has appropriate access permission for the memory access. First, an associated sidecar register, e.g., 16a, can be checked, and, if the address of the memory access cannot be identified in the sidecar register 16a, the PLB 18 can be checked and the sidecar register, e.g., 16a, can be re-loaded from the PLB 18. If the address of the memory access cannot be identified in the sidecar register, e.g., 16a, or the PLB 18, then both the PLB 18 and the sidecar register, e.g., 16a, can be reloaded from the permissions table 40.

Each sidecar register 16 can cache the last permissions table segment accessed by a respective address register 14 or by the program counter 20. The information stored in the sidecar registers 16, which identifies permission values associated with entire segments, can map a wider address range than the PLB 18 from which it was fetched. The sidecar registers, therefore, can avoid both lookups in the PLB 18 and also PLB misses.

The permissions, gate, and stack tables 40, 36, 38 jointly describe protection domain "access permissions," i.e., the operations that software associated with the protection domain can perform on the memory 30 such as execute a return gate or write to a location in the memory 30. A portion of the memory 30, is "accessible" if there is some way for software associated with a protection domain to access it without causing a fault, i.e., by reading, writing, or executing. Memory is "shared" when it is accessible by more than one software portion associated with a respective more than one protection domain.

The memory supervisor 42, which in one particular embodiment, can be software running in the memory 30, provides a variety of functions to control access permissions to the memory 30. For example, the memory supervisor 42 can manage permission values, protection domain ownerships, export permissions, and the creation and deletion of protection domains, each of which is described more fully below.

The memory supervisor 42 provides a hardware-independent interface to allow higher-level software to request a change in access permissions to the memory 30. The memory supervisor 42 can also check memory requests against permissions policy, and can translate valid requests into modifications to the permissions table 40, the gate table 36, and/or the stack permissions table 38. The memory supervisor 42 can also be responsible for revoking permissions when required, e.g., when a memory region is freed or when a protection domain is deleted. It may be desirable to use the memory supervisor 42 to modify or revoke permissions rather than other software because the other software, running in another protection domain, may not revoke or modify permission in the permissions table 40 correctly. The memory supervisor 42 can keep track of how memory regions are shared among protection domains, i.e., which protection domains have been given access permissions to particular memory regions.

Memory "ownership" is a component of permissions policy that can be implemented entirely within the memory supervisor 42. A protection domain can have authority on permissions and use of a memory region associated with the protection domain. Every address space is divided into non-overlapping regions, where each region can be owned by exactly one protection domain. The memory supervisor itself owns all of memory initially. An "owner" protection domain can set arbitrary access permissions on memory that it owns, and can grant arbitrary access permissions, or export permissions, on that memory to other protection domains. Memory ownership can have a coarser resolution than memory protection, and can change less frequently.

The memory supervisor 42 can maintain ownership information using a sorted list of memory regions and their owners, which are protection domains. In one particular embodiment, the only way for a protection domain to cede ownership of memory that it owns is to create a new protection domain using that memory. In another embodiments, the memory supervisor 42 could provide a change ownership (e.g., chown) call, which would allow a protection domain to give ownership of a memory region to another protection domain.

The memory supervisor 42 also implements "export permissions," which describe how a protection domain can grant permissions to another protection domain. Ownership conveys unlimited export permissions, but non-owner protection domains can have restricted export permissions. With this arrangement, an owner protection domain can give another protection domain (e.g., protection domain X) read-write access permissions on a buffer, but limit it to read-only export permissions. Software associated with protection domain X can read and write the buffer, but cannot grant read-write permissions on the buffer to another software portion associated with a third protection domain Y. The memory supervisor 42 can implement a limited form of export permissions, based on ownership and access permissions. An owner can export permissions freely, while a non-owner can export only up to its access permissions level.

Dynamic memory allocation can still be managed by a software kernel. This allows main kernel allocators to remain outside the memory supervisor 42, and lets the kernel retain custom memory allocators, i.e., allocators that manage their own free list such as the Linux "inode" allocator. The memory supervisor 42 can provide special API calls (e.g., perm alloc and perm free) to support allocators, which provide memory to other protection domains. A protection domain (e.g., protection domain X) can call an allocator protection domain (e.g., protection domain Z), and, in response, the allocator protection domain can determine the start address and length of the memory that X will receive. The allocator protection domain can then call the memory supervisor 42 to establish permissions for the protection domain X on the memory it has chosen. The memory supervisor 42 determines that the permissions are for the protection domain X by reading the cross-domain call stack 32, so it cannot be fooled by a misbehaving allocator. An allocator protection domain can either own the memory it allocates, which is the fast path used by so-called slab and page allocators, or it can have export permissions, which is used by custom allocators because they do not own the memory they allocate; they get it from the slab or page allocator.

The memory supervisor 42 can also be responsible for managing thread-local stack permissions. Threads can only change control permissions in their active frame, and the memory supervisor 42 can reject permission change requests for memory between the most recently saved frame base, fb 28b, and the stack base, sb 26c. If a thread grants write permission on a frame, it must revoke permissions on the frame before the frame returns. On scheduling events, the kernel instructs the memory supervisor 42 to save and reload the thread-local CPU registers (sb 28a, fb 28b, sl 28c, CDST 25, and the stack table base register 26c)

The memory supervisor 42 can manage the creation and deletion of protection domains. A protection domain can create a new protection domain by "subdividing," and passing ownership of a region of its own memory to the new child protection domain. The memory supervisor 42 can track parental relationships between protection domains. When a protection domain is deleted, ownership of its memory regions can pass to its closest ancestor. The memory supervisor 42 can also revoke permissions on memory owned by the deleted protection domain from all protection domains.

As described above, the memory supervisor 42 can provide an API and policies for managing memory ownership and permissions. In one particular embodiment, two calls can be used to set permissions on memory regions. For example, a function "mprot" can set permission values for the current protection domain while a function "mprot export" can set permission values in another protection domain. A function "pd subdivide" can create a new protection domain, while a function "pd free" can delete a protection domain. Memory allocator protection domains can call memory supervisor functions "perm alloc" and "perm free" to give the caller of the allocator access permissions in the memory being allocated.

The memory supervisor policy can follow a few general rules. For example, a non-owner cannot dictate permissions to an owner; a non-owner cannot downgrade the permissions of another protection domain; and a non-owner cannot upgrade its own permissions.

A "group" protection domain is a collection of memory regions, each with a specified permission. Group protection domains are useful when multiple protection domains need access to the same set of memory regions, and where the memory segments in that set change over time.

A "regular" protection domain can create a "group" protection domain and grant the group access permissions to various memory regions. Another protection domain can then "join" the group protection domain to gain the permissions specified by the segments in the group.

Figure 2:
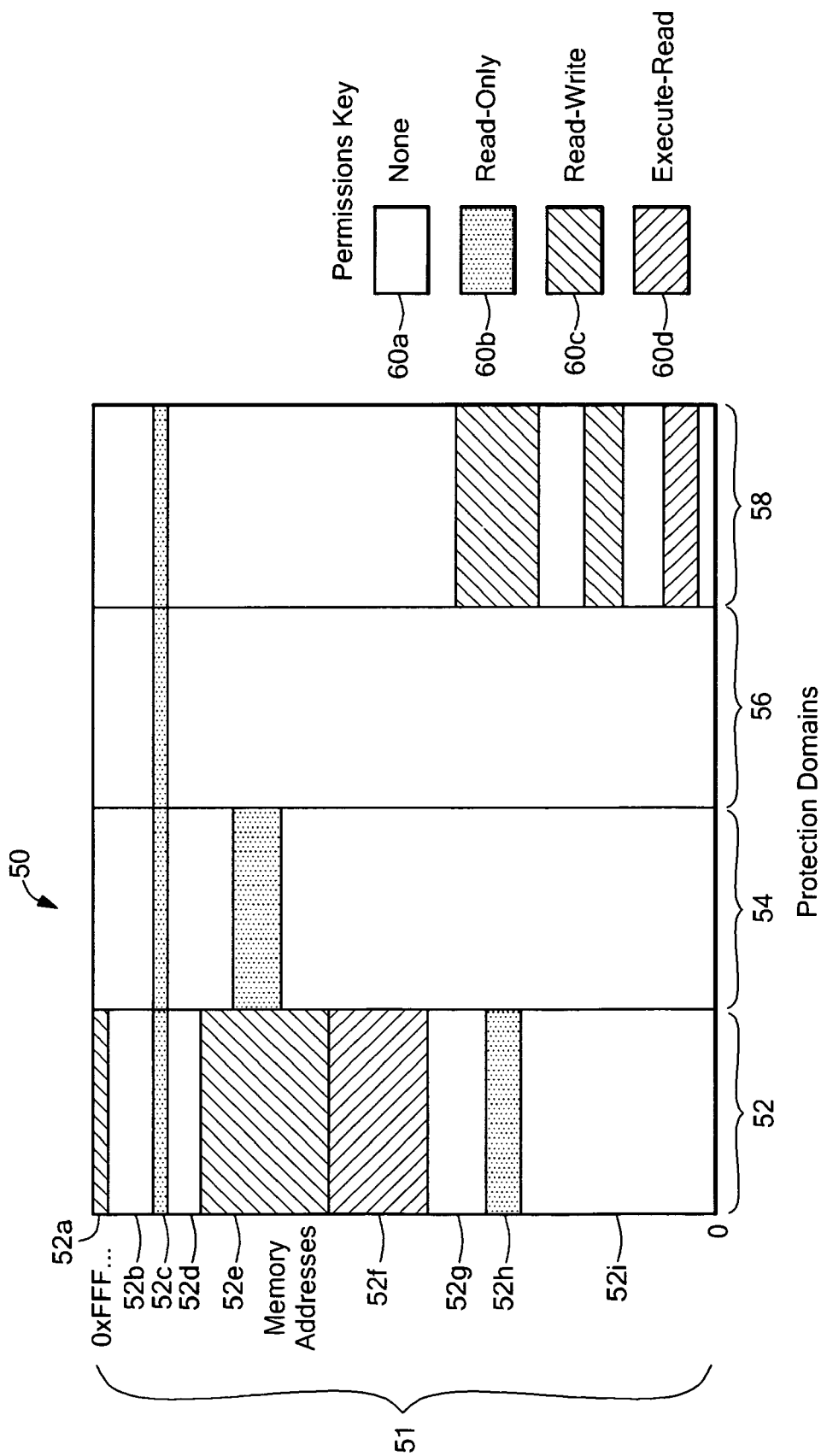
FIG. 2 is a diagram showing a plurality of protection domains associated with memory addresses in accordance with a permissions table shown in FIG. 1.

Referring now to FIG. 2, protection domains 52-58 are each associated with a range of memory addresses 62. The memory addresses 62 can be a virtual memory addresses or physical memory addresses. The memory addresses 62 can include all virtual or physical memory addresses. However, in another embodiment, the memory addresses 62 include only a portion of the virtual or physical memory addresses.

Crosshatched regions shown in FIG. 2 each represent corresponding segments, each having a respective permission 60a-60d (i.e., permission value). Permission values 60a-60d correspond to those shown above in Table 1.

A protection domain, for example, the protection domain 58, can be associated with more than one software thread. Also, every software thread is associated with exactly one protection domain at any point in its execution. A software program or program portion associated with a protection domain that wants to share data with another software program or program portion must share at least a portion of its address spaces, for example, by having a protection domain with a segment provisioned as read-write.

While permission values 60a-60d are shown, as described above, the permissions table 40 (FIG. 1) can hold metadata values arranged as the protection domains, where the metadata values each include, but are not limited to, a respective permission value. The metadata values stored in the permissions table 40 can also include other information, for example, a cache coherence state value, a not-cached state value, a cached-exclusive state value, a cached-modified state value, and a cached-shared state value. Therefore, it will be apparent that, in other embodiments, the protection domains 52-58 can be associated with both the permission values 60a-60d as well as with other information.

Each memory region of a protection domain having a contiguous permission value is a protection domain segment. For example, each of the memory regions 52a-52l is a segment. Each protection domain can be different, each having permissions set on arbitrary sized memory regions, including memory regions (segments) of one word, or even one byte.

In one particular embodiment, the system and technique for fine-grained computer memory protection uses two-bit permission values, as shown in Table 1 above. In other embodiments, the system and technique can support more than two permission bits or fewer than two permission bits, different permission types, and/or other information.

Every allocated region of memory, e.g., the memory 30 of FIG. 1, is owned by one protection domain, and this ownership is maintained by a memory supervisor, e.g., the memory supervisor 42 of FIG. 1. As described above, to support the construction of protected subsystems, the owner of a region can export protected views of the region to other protection domains.

Some of the protection domains can be generated by the software kernel, while others can be generated, for example, by the memory supervisor 42 upon request by a software application programs. The memory supervisor 42, described in conjunction with FIG. 1, manages the protection domains.

Figure 3:
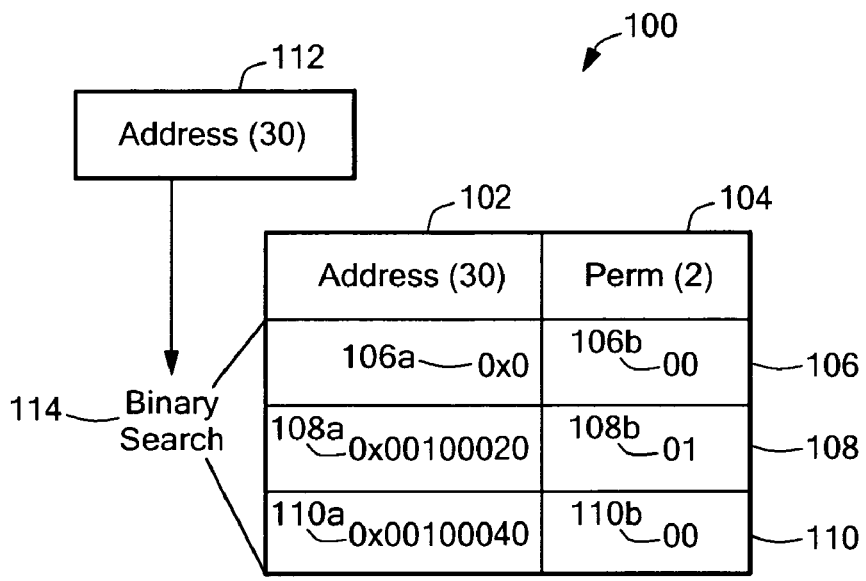
FIG. 3 is a diagram illustrating an exemplary sorted segment table (SST) in accordance with the permissions table shown in FIG. 1.

Referring now to FIG. 3, an exemplary "sorted segment table" (SST) 100, is but one permissions table structure in which addresses and associated permission values can be arranged (i.e., in the permissions table 40 of FIG. 1). One particular embodiment of the SST 100 includes a linear array of entries, for example, entries 106, 108, 110, each entry a segment ordered by segment start addresses, for example, segment start addresses 106a, 108a, 110a. Segments can be any number of words (or bytes) in length, including, but not limited to, one word (or byte), and start on any word (or byte) boundary, but cannot overlap. In the exemplary embodiment shown, each entry is four bytes wide, and includes a 30-bit start address 102 (which is word aligned, so only 30 bits are needed) and a 2-bit permission value field 104. The start address of a next segment is implicitly identified by the end of a current segment, so segments with no permission values can be used to encode gaps and to terminate the list.

In operation, on a PLB miss (PLB 18, FIG. 1) associated with a program address 112, a binary search 114 is performed in the SST 100 to locate a segment containing an address for which the search is conducted. The SST 100 is a compact way of describing and storing addresses 102 and associated permission values 104 in the permissions table 40 (FIG. 1), especially when the number of segments is small. However, when the number of segments is large, the binary search of the SST 100 can take many steps in order to locate a segment. Also, because the segments are contiguous, they must be copied, i.e., moved, when a new permission value is inserted. Furthermore, the SST 100 can only be shared between protection domains in its entirety, i.e., two protection domains have to have identical permissions maps.

It should be apparent that entries in the permissions table 40 (FIG. 1) encode both address ranges and permission values associated with each of the address ranges, wherein the address ranges are associated with the memory 30 of FIG. 1.

Figure 4:
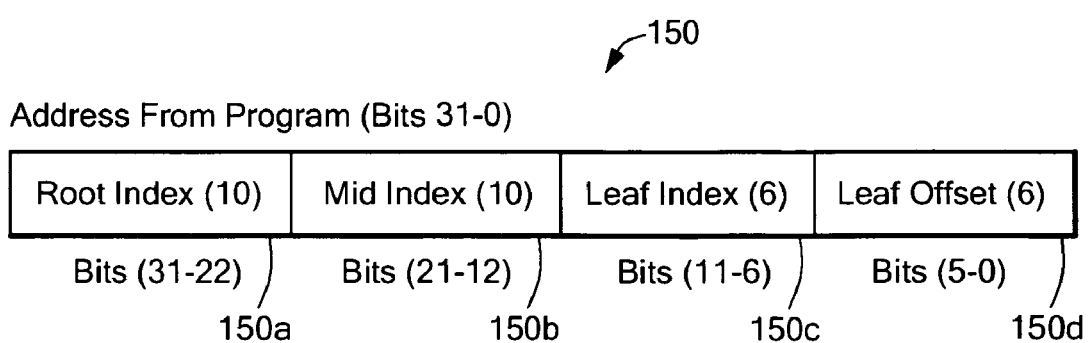
FIG. 4 is a diagram illustrating an exemplary multi-level permissions table address in accordance with the permissions table shown in FIG. 1.

Referring now to FIG. 4, a "multi-level permissions table" (MLPT) provides an alternate permissions table structure in which addresses and associated permission values can be arranged (i.e., in the permissions table 40 of FIG. 1). An MLPT address 150, forming a part of the MLPT entries in the permission table 40, includes a root index 150a, a mid index 150b, a leaf index 150c, and a leaf offset 150d. An MLPT lookup algorithm, shown below, can be used to perform a lookup within MLPT addresses in the permissions table 40.

Below is shown pseudo-code for the MLPT lookup algorithm described above.

```
PERM_ENTRY MLPT_lookup(addr_t addr) {
PERM_ENTRY e=root[addr>>22];
if(is_tbl_ptr(e)) {
PERM_TABLE*mid=e<<2;
e=mid[(addr>>12) & 0x3FF];
if(is_tbl_ptr(e)) {
PERM_TABLE*leaf=e<<2;
e=leaf[(addr>>6) & 0x3F];
}
}
return e;
}
```

The exemplary MLPT address 150 has thirty-two bits. In one particular embodiment, entries in the root index 150a map to 4 MB blocks. Entries in the mid index 150b map to 4 KB blocks. Entries in the leaf index 150c map to sixty-four byte blocks. Entries in the leaf offset 150d map to individual bytes, of which there are sixty-four. The MLPT address 150 can reduce space usage in the permission stable 40 by sharing lower level tables across different protection domains that share the same permissions map.

An MLPT structured permissions table (e.g., permissions table 40) having an MLPT address 150 is indexed with an address and returns a permissions table entry, which, in one particular embodiment, is a vector of permission values, also stored in the permissions table 40. Permission vectors are described below in conjunction with FIG. 5. The base of the root index 150a is held in a dedicated CPU register, e.g., the permissions table base register 26a (FIG. 1).

The MLPT can form a trie structure, for which the root index 150a points to and provides an index into a first level table stored in the permission table 40. The first level table indexed by the root index 150a can point to a second level table indexed into by the mid index 150b. The second level table indexed by the mid index 150b can point to a third level table indexed into by the leaf index 150c and by the leaf offset 150d. The third level table indexed by the leaf index 150c can provide the permission values, for example, as a permission vector. The leaf offset 150d can index into the permission vector identified by the leaf index 150c in the third level table to provide a permission value associated, for example, with a particular word of the memory 30 (FIG. 1). However, in an alternate embodiment, an entry in the third level table can instead provide a pointer to a record having permission values, which is held in an area of operating system memory dedicated to such overflow records.

The entries in the first, second, and level third tables can be either pointer entries to another table or a permission value entry. The two types of entries are distinguished more fully in conjunction with FIG. 6. However, let is suffice here to say that any of the first, second, and third level tables can provide permission values, each at different granularity. For example, in one particular embodiment, if a permissions value entry is found in the first level table, the granularity of the permissions value entry can be 4 MB or less, if a permissions value entry is found in the second level table, the granularity of the permissions value entry can be 4 KB or less, if a permissions value entry is found in the third level table, the granularity of the permissions value entry can be sixty-four bytes (sixteen words) or less. However, in other embodiments, the first, second, and third level tables can have more than or less than the granularities described above. In still further embodiments, more than three or fewer than three levels of tables can be provided.

Figure 5:
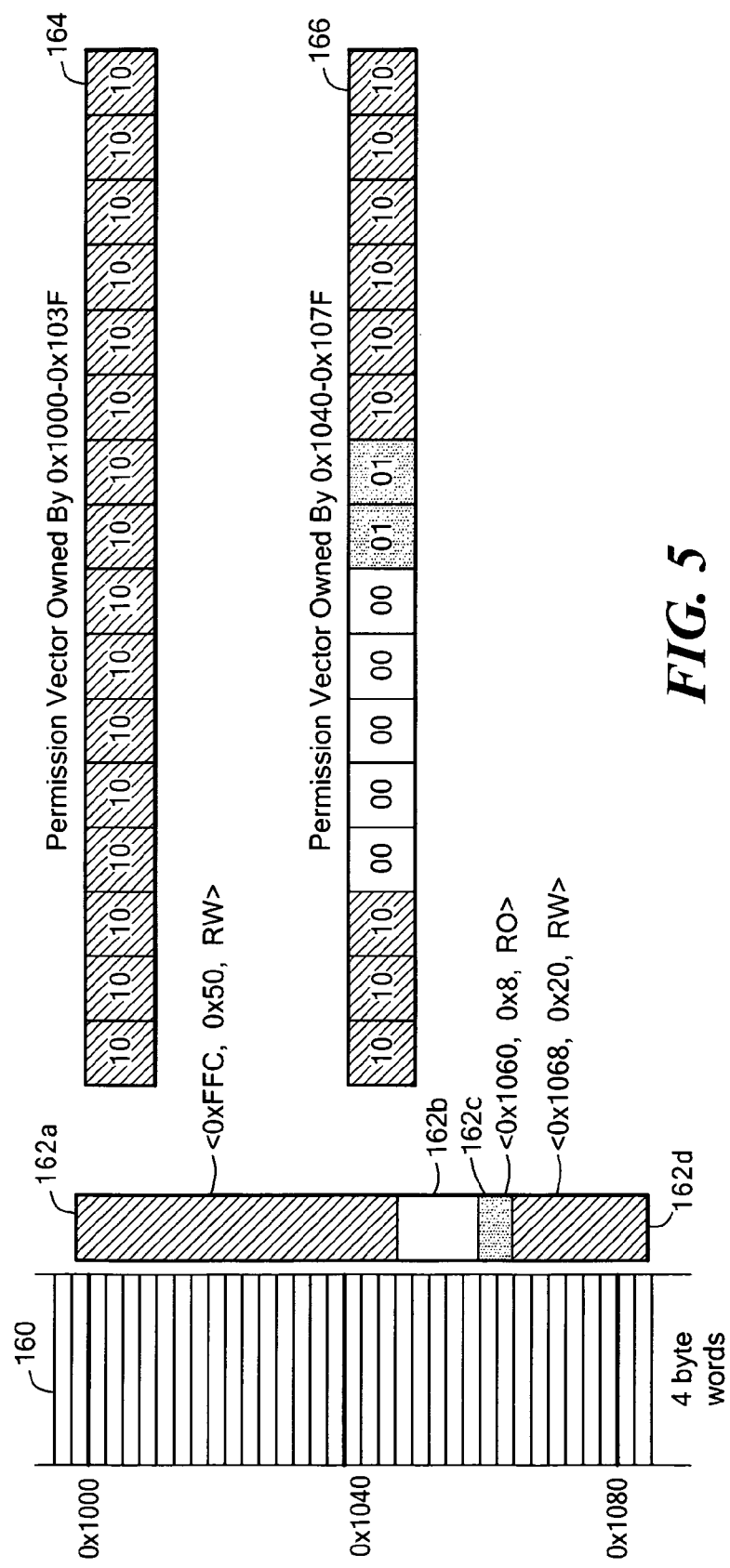
FIG. 5 is a diagram illustrating an exemplary permission vector associated with a multi-level permissions table in accordance with the permissions table shown in FIG. 1.

Referring now to FIG. 5, a leaf level MLPT permission entry can be provided, for example, in a permission vector format, each vector having, for example, sixteen two-bit values indicating the permissions for each of sixteen four-byte words.

An exemplary address space 160 having four-byte words is associated with segments 162a-162d collectively referred to as segments 162. Permission vectors 164, 166, each contain sixteen permission values, each permission value having two bits (see Table 1), and each permission value associated with a four-byte word in the address space 160.

Segments 162, each corresponding to a group of contiguous addresses having the same permission value, are represented with the tuple <base addr, length, permissions>, for example <0xFFC, 0x50, RW>. Addresses and lengths are given in bytes unless otherwise noted, and a word is four bytes long. A user segment <0xFFC, 0x50, RW> is broken up between three permission vectors, only the latter two 164, 166 of which are shown.

An address range "owns" a permissions table vector entry if looking up any address in the range finds that vector. For example, an address range 0x1000-0x103F owns the first permission vector entry 164.

The permission values "00" in the permission vector 166, corresponds to the segment 162b, having a no-permission value as identified in Table 1.

Permission vectors 164, 166 are shown to contain permission values, each associated with one word in the address space 160. However, as described above for the first, second, and third level tables associated with the MLPT address 150 of FIG. 4, permission vectors can be provided that identify other permission values each associated with more than one word in the address apace 160. For example, a permission vector pointed to by an address in the mid index 150b (FIG. 4) can represent individual permissions for eight 512 byte sub-blocks within the 4 KB block mapped by a mid index address entry 150b.

Figure 6:
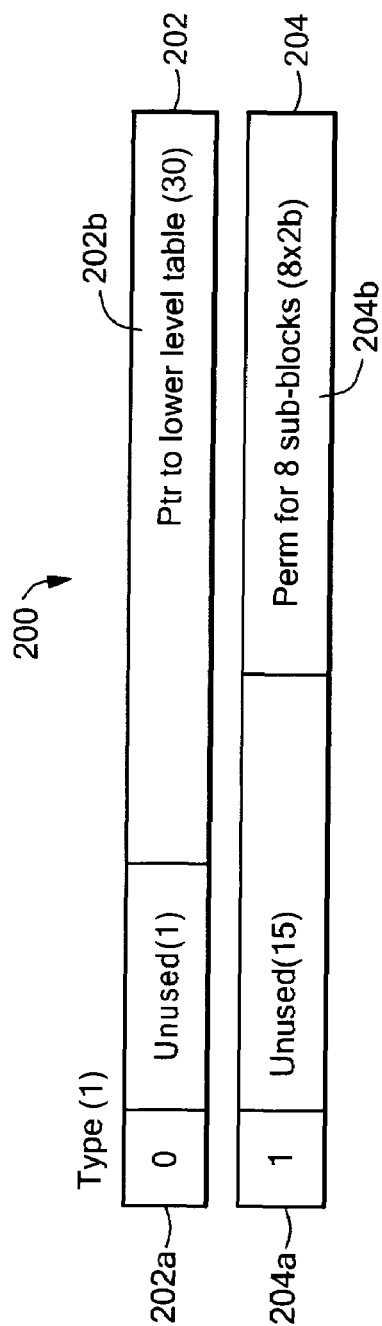
FIG. 6 is a diagram illustrating an exemplary bit allocation for upper level entries in the exemplary multi-level permissions table.

Referring now to FIG. 6, in one particular embodiment, upper level permissions table entries 200, for example, a first type of entry 202 in the MLPT, can include a pointer 202b to a lower level table. However, to reduce space and run-time overhead for large user segments, another type of upper level permissions table entry 204 can hold a permissions vector 204b for a group of sub-blocks, for example, for eight sub-blocks. The two types of permissions table entries can be identified, for example, with a single bit 202a, 204a.

In one particular embodiment, described in conjunction with FIG. 4 above, entries in the first level table, indexed, for example, by the root index 150a of FIG. 4, and in the second level table, indexed, for example, by the mid index 150b of FIG. 4, include either pointer entries (e.g., 202) or permission vectors (e.g., 204) and are therefore encoded as shown in FIG. 6. However, in one particular embodiment, entries in the third level table, indexed, for example, by the leaf index 150c of FIG. 4 include only permission vectors (e.g., 204), and therefore, the third level table can use a different encoding (not shown) in which all thirty-two bits are used to encode permission values (2-bits each) for sixteen sub-blocks (i.e., words) rather than eight.

Although permission vectors representing permission values for sixteen word portions of an address space as described above provide a simple format for MLPT permissions table entries, they do not take advantage of the fact that most user segments are longer than a single word. Also, the upper level permissions table entries 202, 204, FIG. 6 can be inefficient at representing non-power-of-two sized user segments.

The sorted segment table (SST) 100 described in conjunction with FIG. 3 demonstrates a more compact encoding for abutting segments, wherein only segment base addresses and associated permission values are needed because the length of one segment is implicit in the base of the next. A mini-sorted-segment table (mini-SST), described below in conjunction with FIG. 7, uses the same technique to increase the encoding density of an MLPT table entry having permissions values.

While two types of permission table entries 202, 204 are shown, other types of permissions table entries are shown and described in conjunction with FIG. 7 and Table 2 below.

Figure 7:
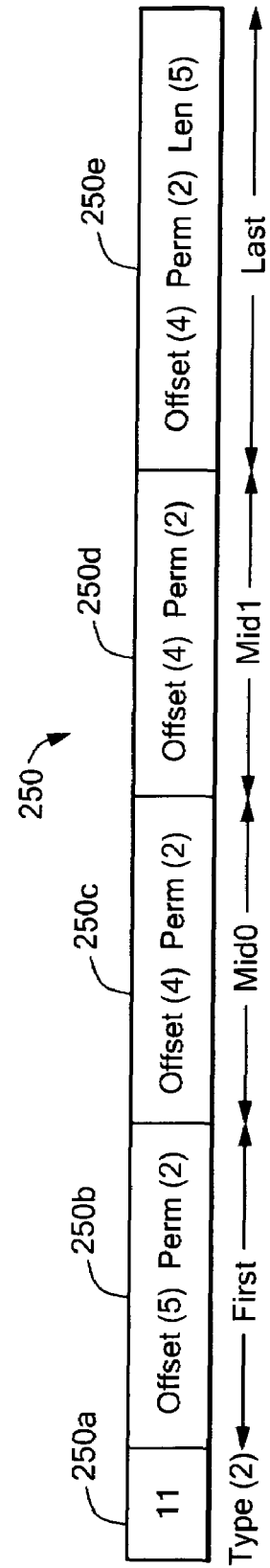
FIG. 7 is a diagram illustrating an exemplary bit allocation for a mini-sorted-segment table (mini-SST) in accordance with the permissions table shown in FIG. 1.

Referring now to FIG. 7, a mini-sorted-segment table entry 250, or mini-SST entry, provides an alternate structure in which addresses and associated permission values can be arranged (i.e., in the permissions table 40 of FIG. 1). The mini-SST entry 250 includes both addresses and permission values. In one particular embodiment, address bit encoding can represent up to four segments, a "first" segment 250b, a "mid0" segment 250c, a "mid1" segment 250d, and a "last" segment 250e, each having an offset value and a permission value with a number of bits as indicated in parentheses. Starting offset addresses and permission values are given for each of four segments, allowing lengths of the first three segments (first 250b, mid0 250c, and mid1 250d) to be implicit in the starting offsets of an adjacent segment. Length, "len," of the last segment 250e is explicitly encoded. In one particular embodiment, three of the offsets have four bits and one of the offsets has five bits as shown. The exemplary mini-SST entry 250 describes four segments corresponding to a size of heap allocated objects, which is usually greater than 16 bytes. However, in other embodiments, the mini-SST entry can also describe more than four or fewer than four segments.

Mini-SST entries encode permission values for a larger region of memory than sixteen words (or sixteen sub-blocks) described above in conjunction with FIG. 6. The first segment 250b has an offset, which represents its starting point as the number of sub-blocks (0-31) before the base address of the owning range of the mini-SST entry 250. Segments mid0 and mid1 250c, 250d, respectively, begin and end within 16 sub-blocks associated with the mini-SST 250 entry. The last segment 250e can start at any sub-block in the mini-SST entry 250 except the first (a zero offset means the last segment starts at the end address of the entry). The last segment 250e has an explicit length, "len," that extends up to 31 sub-blocks from the end of the owning range of the mini-SST entry 250. The largest address span for the mini-SST entry 250 is seventy-nine sub-blocks (thirty-one before, sixteen within, thirty-two after).

The mini-SST entry 250 reserves two bits for a "type" value 250a. Table 2 below shows four possible type values 250a. A first type value, 00, indicates that an entry is a pointer to a lower level table (e.g., 202, FIG. 6). A second type value, 01, indicates that the entry is a mini-SST entry, indicating permission values for four segments as described above. A third type value, 10, indicates that the entry is a permissions vector (e.g., 204, FIG. 6). A fourth type value, 11, indicates that the entry is a pointer to a mini-SST entry.

TABLE 2

| Type | Description |
| --- | --- |
| 00 | Pointer to next level table. |
| 11 | Mini-SST entry (4 segments spanning 79 sub-blocks). |
| 01 | Pointer to permission vector (16x2b). |
| 10 | Pointer to mini-SST+ (e.g., translation (6x32b)). |

Upper level tables can contain pointers to lower level tables. Any level table can have a mini-SST entry. Any level can contain a pointer to a vector of permission values, which are described above in conjunction with FIGS. 5 and 6. This is necessary because mini-SST entries can only represent up to four abutting segments. If a region of memory contains more than four abutting segments, the permission values can be represented using a permission vector held in a separate word of storage, and pointed to by the entry. Also, a pointer can be used to point to a mini-SST entry and also to additional information.

While four types of table entries are shown in Table 2, it will be recognized that, in one particular embodiment described above in conjunction with FIG. 6, the third level table, which is the lowest level table, can also have a different encoding (not shown) in which all thirty-two bits are used to encode permission values (2-bits each) for sixteen sub-blocks (i.e., words).

Table 2 shows but some of the different possible types of entries that can be associated with the permissions table 40 of FIG. 1. It should be apparent, as described in conjunction with FIG. 6, that leaf tables, i.e., the third, or lowest, level table in the MLPT trie structure, do not have a type 00.

A mini-SST entry, e.g., 250, in the permissions table 40 (FIG. 1) can be used to increase the encoding density of an individual MLPT entry permission vector entry in the upper levels of the MLPT trie structure containing only eight sub-blocks. The mini-SST entry 250 allows more sub-blocks to be represented by each mini-SST entry, but only for a limited number of segments. In one particular embodiment, a mini-SST entry 250 can represent seventy-nine sub-blocks but only four segments, each segment having a respective contiguous permission value. In contrast, the permissions vector entry can represent permission information for only up to sixteen sub-block (i.e., words) at the third, or lowest, level table, and only eight sub-blocks at the first and second level tables, as described above. For example, as described above, each permissions vector associated with a respective mid index address 150b of FIG. 4 can represent individual permissions for eight 512 byte sub-blocks within the 4 KB block mapped by a mid index address entry 150b.

In the mini-SST format, entries in a root table, which is the first level table, can contain permissions for all 4 GB of the 32-bit address space, entries in a mid level table, which is the second level table, can contain permissions information for 79*256 KB=19.75 MB, and entries in a bottom level table, which is the third level table, can contain permissions information for 79 words=316 bytes. While each entry can hold permissions information for a large piece of the address space, the entries will overlap if they hold permissions for more than 4 MB/4 KB/64 B of address space (for each level table).

Figure 8:
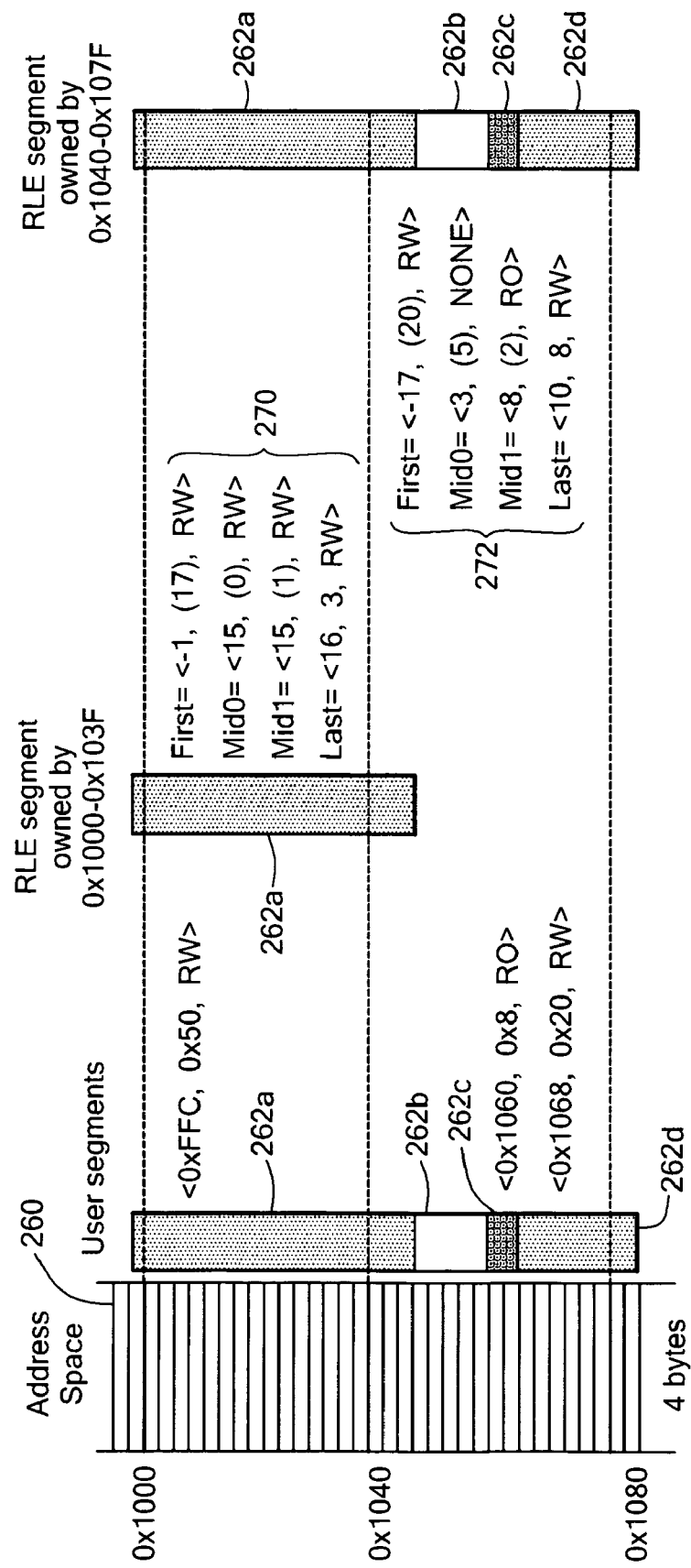
FIG. 8 is a diagram illustrating an exemplary multi-level permissions table having an associated mini-SST in accordance with the permissions table shown in FIG. 1.

Referring now to FIG. 8, an example of use of a mini-SST entry is shown. Segments 262a, 262b, 262c, collectively referred to as segments 262, are labeled for illustrative purposes using a tuple, <base, length, permission >. Segment lengths shown in parentheses are represented implicitly as a difference in the base offsets of neighboring table segments, and are therefore redundant in the illustrated labeling.

A segment 262a owned by the address range 0x1000-0x103F has segment information going back to 0xFFC and going forward to 0x104C. The segment mapped by the mini-SST entry at address range 0x1000-0x103F has been split across "first," "mid0," "mid1," and "last" mini-SST segments 270. Therefore, single segment 262a can be represented by a mini-SST entry 270. Segments 262a, 262b, 262c, 262d can be represented by the mini-SST entry 272.

Mini-SST entries in the permissions table 40 (FIG. 1) can contain overlapping address ranges. When an entry owned by one range is changed, any other entries which overlap with that range might also need updating. For example, if part of the user segment starting at 0xFFC is freed by protecting a segment as <0x1040, 0xC, NONE>, it would be necessary to read and write the entries for both 0x1000-0x103F and 0x1040-0x107F even though the segment being written does not overlap the address range 0x100-0x103F. When a memory segment is modified, all entries overlapping the modified segment must also be flushed from the PLB 18 (FIG. 1).

The protection lookaside buffer (PLB) 18 (FIG. 1) caches entries form the permissions table 40 (FIG. 1). The PLB 18 can use a ternary content addressable memory (CAM) structure to hold address ternary tags that have a varying number of significant bits. The PLB tags have to be somewhat wide, for example, 26 bits, to support fine-grain addressing. Entries in the PLB 18 are also tagged with protection domain identifiers (PD-IDs).

The ternary tags stored in the PLB 18 can contain additional low-order "don't care" address bits to allow the tag to match addresses beyond the owning address range. For example, the tag 0x10XX, where XX are don't care bits, will match any address from 0x1000-0x10FF. On a re-fill of the PLB 18, the tag is set to match addresses within the largest naturally aligned power-of-two sized block for which the entry has complete permissions information. Referring to the example in FIG. 8, a reference to 0x1000 will pull in the entry for the block 0x1000-0x103F and the PLB tag will match any address in that range. A reference to 0x1040 will bring in the entry for the block 0x1040-x107F, but this entry can be stored with a tag that matches the range 0x1000-0x107F because it has complete information for that naturally aligned power-of-two sized block. This technique increases effective PLB capacity by allowing a single PLB entry to cache permissions for a larger range of addresses.

When permissions are changed for a region in the permissions table 40, it is often necessary to flush out-of-date entries in the PLB 18. To avoid excessive flushing of the PLB 18, a ternary search key can be used for the CAM tags to invalidate potentially stale entries within one cycle. The ternary search key has some number of low order "don't care" bits, to match all entries in the PLB 18 within the smallest naturally aligned power-of-two sized block that completely encloses the segment being modified (this is a conservative scheme that may invalidate unmodified entries that happen to lie in this range). A similar scheme is used to avoid having two tags hit simultaneously in the PLB CAM structure. On a PLB refill, all entries that are inside the range of a new tag are first searched for and then invalidated using a single search cycle with low-order "don't care" bits.

Figure 9:
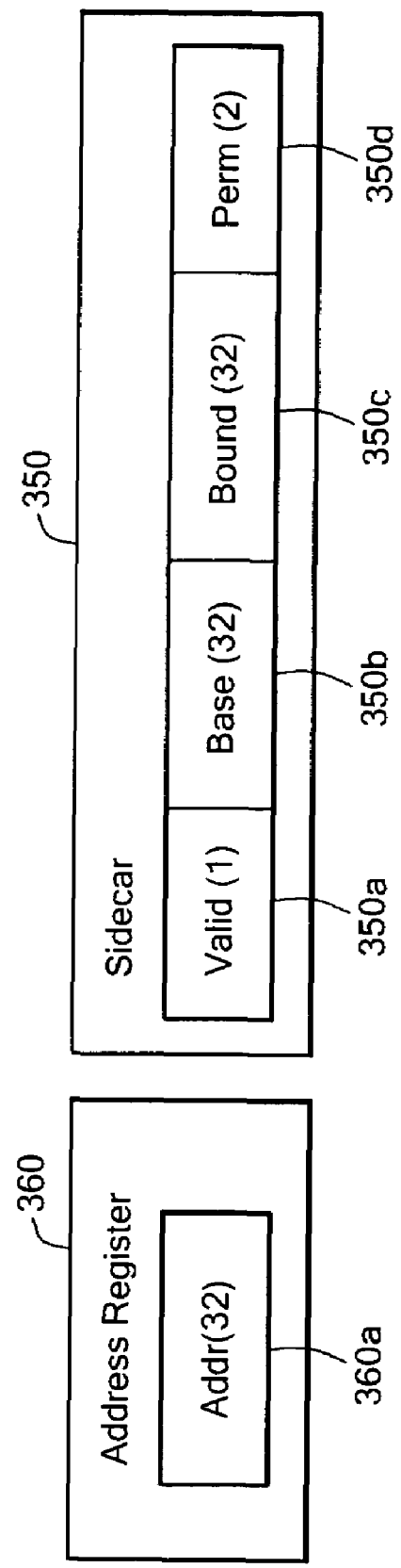
FIG. 9 is a diagram illustrating an exemplary sidecar register bit allocation in accordance with the sidecar registers shown in FIG. 1.

Referring now to FIG. 9, a sidecar register 350 (see also 16a, FIG. 1), which holds information for one segment, is associated with each address register, for example, the address register 360 (see also 14, FIG. 1). The exemplary sidecar register 350 includes a validity value 350a having one bit, a base value 350b having thirty-two bits, a bound value 350c having thirty-two bits, and a permission value 350d having two bits. The base value 350b and the bounds value 350c identify a segment having the permission value 350d. Exemplary permission values are identified above in Table 1.

The program counter 20 (FIG. 1) also has its own sidecar register (e.g., 16d, FIG. 1) used to provide permission values associated with instruction fetches.

On a request to the sidecar register 350, i.e., with a "demand address" 360a, that results in a sidecar register miss, i.e., the demand address is not found in the sidecar register 350, the demand address 360a is looked up in the PLB 18, and the sidecar register 350 is loaded with the validity value 350a, the base value 350b, the bounds value 350c, and the permission value 350d associated with the corresponding entry in the PLB 18.

On a request to the PLB 18 associated with a "demand address" 360a that results in a PLB miss, i.e., the demand address is not found in the PLB 18, the demand address 360a is looked up in the permissions table 40 (FIG. 1), and a protection domain associated with demand address 360a is returned and entered into the PLB 18 (FIG. 1). A corresponding validity value 350a, base value 350b, bounds value 350c, and permission value 350d are loaded into the sidecar register 350.

The address base and bounds 350b, 350c of a memory segment can be extended to maximum length (e.g., thirty-two bits) in the sidecar register 350 to facilitate fast checking of the base and bounds. For each access to memory 30 (FIG. 1) with a demand address, e.g., 360a, by the CPU 12 (FIG. 1), the demand address 360a is compared against the base 350b and bounds 350c in the sidecar register 350. If the demand address lies within the range, the sidecar permission value 350d is used to identify the type of memory access that is available.

As described above, if the above range check fails or if the validity value indicates an invalid condition, the contents of the sidecar register are deemed invalid, the PLB 18 is searched for the correct permissions information, and the sidecar register 350 is re-loaded from the PLB 18. If the request to the PLB 18 results in a PLB miss, then the PLB 18 and one of more of the sidecar registers 16 (FIG. 1) are re-loaded from the permissions table 40 (FIG. 1).

As described above, a segment corresponds to a range of contiguous memory addresses, each of which has the same permission value. Use of the sidecar registers 16 (FIG. 1) increases permissions hit rate because they each hold information associated with an entire segment. Any demand address that is within the range of contiguous memory addresses identified in the sidecar register will return a permission value upon a request the sidecar register.

A request to the PLB 18 may not be as efficient as a request to one of the sidecar registers 16. In one particular embodiment, the PLB 18 can identify permission values for only a part of a segment, because its index range is aligned with a power-of-two sized block. For example, referring to FIG. 8, a reference to 0x1040 will load the segment <0xFFC, 0x50, RW> into the sidecar register 350. If location 0xFFC is the demand address 360a, the result will be a permission value hit from the sidecar register 350. However, requesting the address 0xFFC to the PLB 18 will result in a permissions value miss because it only indexes the range 0x1000-0x107F.

Each of the sidecar registers 16 (FIG. 1) can be invalidated by way of the validity bit 350a, for example, by the memory supervisor 42 (FIG. 1), when any protection values are changed. Sidecar registers 16 can also be invalidated on protection domain switches, e.g., during cross-domain calls. However, as described above, the sidecar registers 16 can be refilled rapidly from the PLB 18.

If the permissions table 40 (FIG. 1) is modified, any process that caches data from the permissions table 40 must be notified so it can invalidate its sidecar registers 350 (e.g., by the validity value 350a) and so it can also invalidate one or more portions of information held in the PLB 18.

Figures 10, 10A:
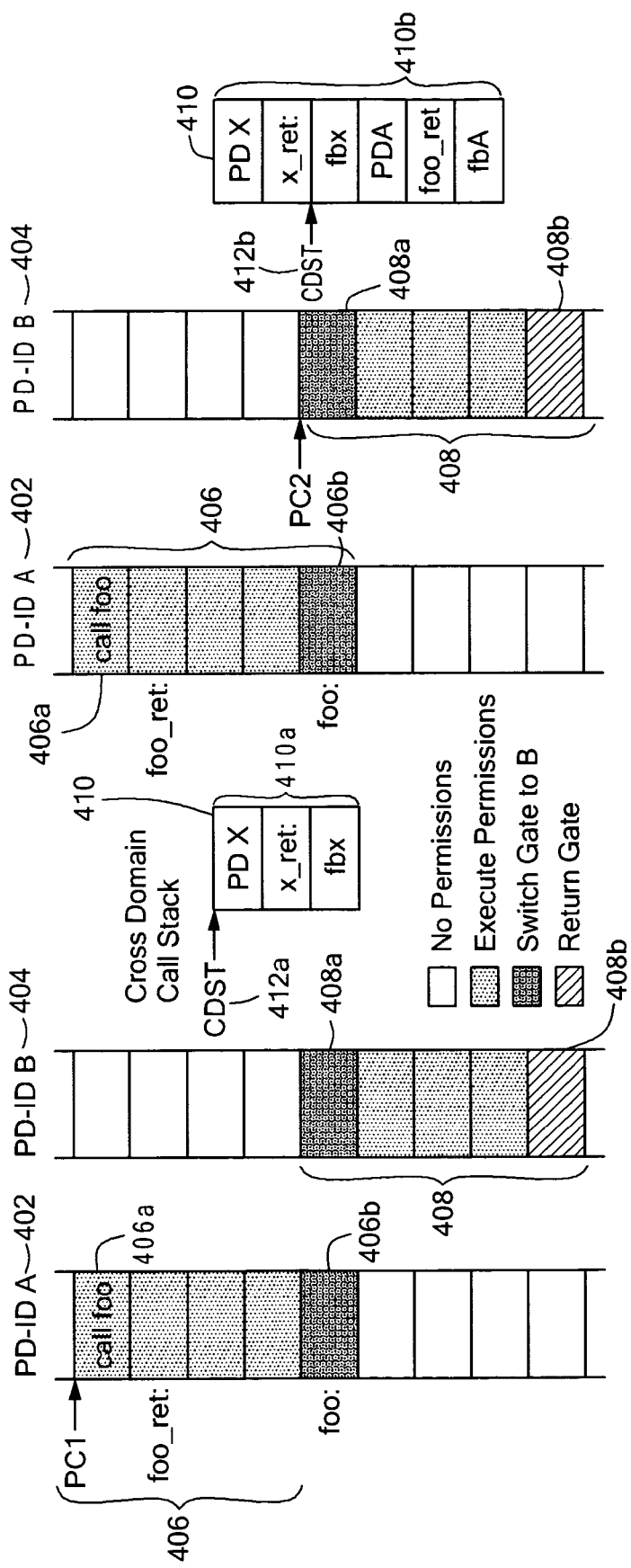
FIGS. 10-10C are diagrams illustrating an exemplary program call and return structure using switch and return gates.
Figures 10B, 10C:
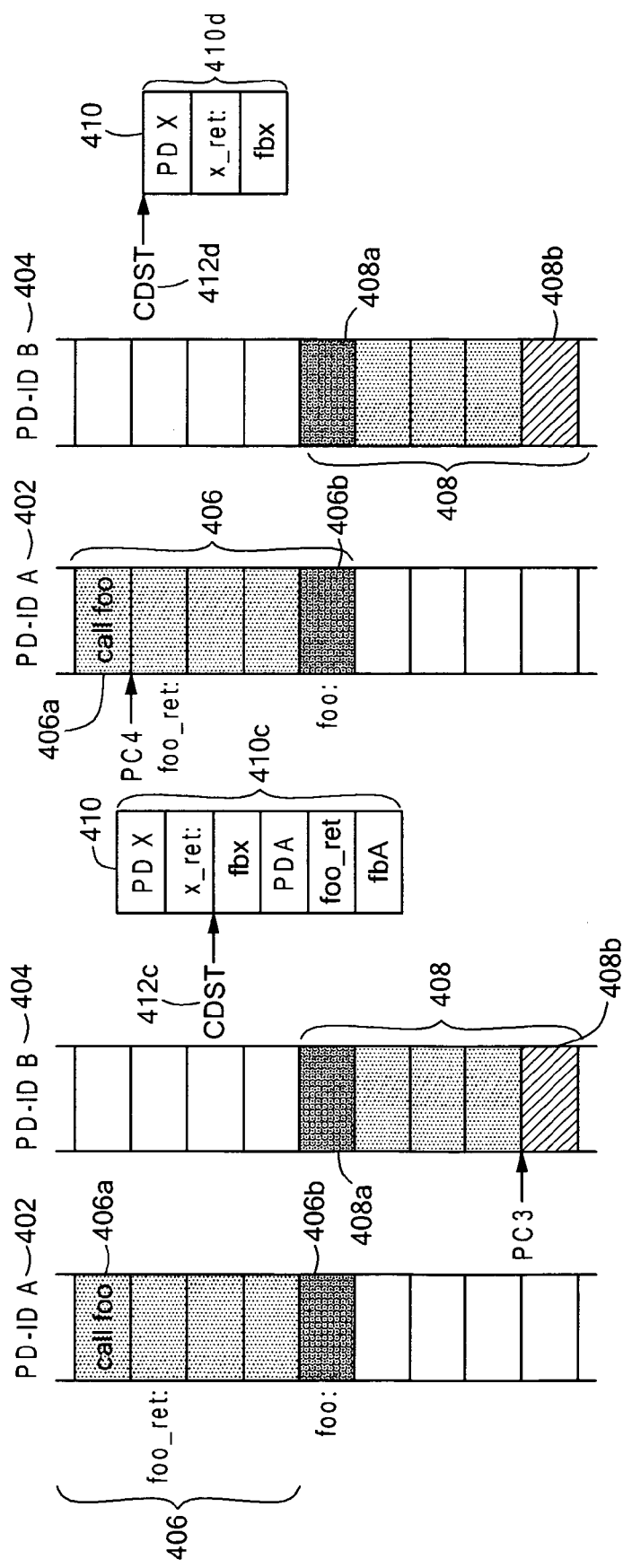

Referring now to FIGS. 10-10C, a cross-domain call includes a source software portion 406 operating in association with a source protection domain PD-ID A 402, and a destination software portion 408 operating in association with a destination protection domain PD-ID B 404. Upon the cross-domain call, a software thread can move between the source software portion 406 and the destination software portion 408. The cross-domain call can be initiated by any control flow instruction, for example, by a subroutine call instruction. An address in the source software portion associated with a source of the call is marked with a switch gate, having switch gate values. Similarly, an address in the destination software portion associated with a return from the call is marked with a return gate, having return gate values. Switch gates having switch gate values and return gates having return gate values are stored in the gate table 36 (FIG. 1). The switch gate values and return gate values are described in conjunction with FIG. 11.

When the software thread moves between protection domains, a cross-domain call stack 410 can be used to keep track of the protection domain context to be used during and after a software call. The cross-domain call stack 410 can be the same as or similar to the cross-domain call stack 32 of FIG. 1.

During program execution, software instructions are processed to determine if they are associated with a switch gate or with a return gate. When a switch gate is detected on a subroutine call from the source software portion 406 to the destination software portion 408, the hardware 10 (FIG. 1) pushes a return address and the source PD-ID onto the cross-domain call stack 410.

When a return gate 408b is detected in the destination software portion 408, the cross-domain call stack 410 is popped, finding the return address and protection domain of the source software portion 406. The system 10 checks the return address against the return address being used by the return instruction.

Referring in more detail to the specific example shown in FIGS. 10-10C, PC1-PC4 indicate the contents of a program counter, for example the program counter 20 of FIG. 1, during four parts of a cross-domain call. Each of the FIGS. 10-10C correspond to a respective one of the four parts of the cross-domain call, also identified by the program counter PC1-PC4. Two different states of the cross-domain call stack 410 are shown, where first state 410a is the same as first state 410c and second state 410b is the same as second state. The first state 410a, 410c occurs at PC1 and PC4, respectively, and the second state 410b, 410d occurs at PC2 and PC3, respectively. The CDST register 25 (FIG. 1) points to locations 412a, 412c when in the first state and to locations 410b, 410d when in the second state.

As an initial condition shown in FIG. 10, it is assumed that a source software portion 406 operates in protection domain A 402 before a "call foo" instruction 406a at PC1. The CDST register at 412a points to a location in the cross-domain call stack 410a associated with an earlier call to the source software portion 406. It is assumed, but not shown, that the source software portion 406 operating in protection domain A 402 was earlier called by some other software portion operating in a protection domain X, identified as PD X. At this initial condition, the cross-domain call stack 410a contains the protection domain identifier, PD X, an address, x_ret, which is a return address to the other software portion, and a frame base pointer, fb X.

Upon reaching the call instruction, "call foo," 406a in the source software portion 406, the program jumps to and identifies a switch gate 406b (indicated by a dark box) within the destination source software portion 406, while still operating in protection domain A. As shown in FIG. 10B, the processor switches to protection domain B in accordance with information associated with and provided by the switch gate 406b, and executes the first instruction 408a of "foo" (at PC2) in the destination software portion 408 in accordance with the protection domain, PD B. The information associated with the switch gate 406a can be acquired, for example, from the gate table 36 of FIG. 1 and/or from the gate lookaside buffer 22 (FIG. 1). Gate information is described in more detail in conjunction with FIG. 11.

The above described identification of the switch gate 406b causes the processor to store one or more of a return address, foo_ret, a frame base, fb A, and a PD-ID, PD A, each associated with the source software portion 406, generating the second state 410b of the cross-domain call stack 410. The identification of the switch gate 406b also causes the processor to update the CDST register to point as indicated at 412b.

In FIG. 10B, at PC3, a return gate 408b is identified and the processor verifies that it is returning to the caller's protection domain at the proper address (PC4). The processor can pop one or more of the return address, foo_ret, the frame base, fb A, and the PD-ID, PD A, to return from the call as shown in FIG. 10C, leaving the cross-domain call stack 410 once again in the first state 410d. After the return, the source software portion 406 again operates in accordance with protection domain PD A.

As described above, in conjunction with return gate 408b, the processor 12 (FIG. 1) checks that the return address matches the saved address popped from the cross-domain call stack 410.

Figure 11:
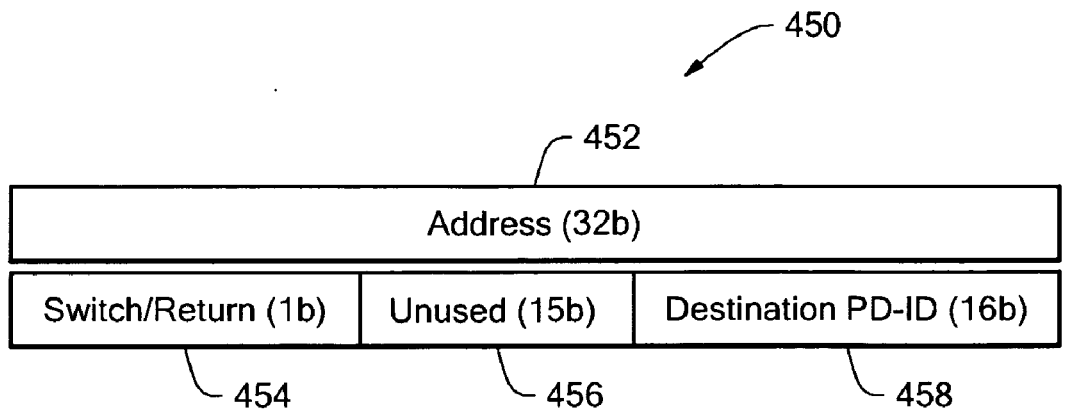
FIG. 11 is a diagram illustrating switch and return gate values in accordance with a gate table shown in FIG. 1.

Referring now to FIG. 11, gate information 450 stored in the gate table 36 (FIG. 1) and/or in the gate lookaside buffer 22 (FIG. 1) can include, but is not limited to an address 452 corresponding to a switch gate or a return gate address, and a switch/return gate identifier 454 to identify the type of gate. If the gate information 450 corresponds to a switch gate, the gate information 450 can also include a destination protection domain identifier (PD-ID) 458.

As should be apparent, both switch and return gates can include more information than regular memory permissions stored in the permissions table 40 (FIG. 1), and so, can be stored in a separate gate table 36 (FIG. 1) and cached with a separate gate lookaside buffer (GLB) 22 (FIG. 1). The number of gates, even for a large system, can be relatively low (e.g., less than 1,000), because software modules tend to have many more internal functions than exported entry points. In one particular embodiment, the gates can be stored in an open hash table to allow rapid retrieval on a GLB miss.

The memory supervisor 42 (FIG. 1) saves and restores the CDST register 25 (FIG. 1) on a context switch. Though only one cross-domain call stack 32 (FIG. 1) is shown, for operating systems that maintain a kernel stack per process, each process can have has its own cross-domain call stack.

The cross-domain call stack 32 (FIG. 1) is within the memory 30 (FIG. 1), and, in one particular embodiment only the memory supervisor 42 (FIG. 1) can access it. During execution, hardware checks the destination PC 20 (FIG. 1) of every instruction fetch for an associated switch or return gate. As described above, if a switch gate is encountered, a call state is saved on the cross-domain call stack 32 (decrementing the CDST register 25 (FIG. 1)) and operation resorts to a new protection domain (i.e., the PD-ID is changed, along with the base pointer 26a (FIG. 1) to the protection domain's permissions table). If a return gate is encountered, the CPU 12 (FIG. 1) reads (i.e., pops) the cross-domain call stack 32 (FIG. 1) to find the saved return address, then adjusts the CDST register 25 accordingly. The return address for the return instruction is checked against the saved address. If the address check succeeds, the protection domain is changed to the stored value and execution resumes at the return address. If the address check fails, the hardware generates a protection fault and execution resumes in a memory fault handler (not shown).

As described above, the CPU 12 (FIG. 1) executes return gates in the destination software protection domain, which can cause problems if software running in a protection domain calls a function that it also exports. Consider, for example, a function "kmalloc." The core kernel exports this routine to modules, so it must place a return gate on its last instruction. If the kernel were to call the "kmalloc" function via a regular function call, the instruction with the return gate would fault because a regular function call does not push the state needed for a cross-domain return onto the cross-domain call stack. Therefore a protection domain must either mark the entry points to exported functions with a switch gate, or it must duplicate exported functions.

In one particular embodiment, the entry point of exported functions are marked with a switch gate as described above, avoiding the task of classifying function calls as protection domain crossing and non-protection domain crossing. With this particular arrangement, the number of cross-domain calls is increased. However, cross-domain calls that do not actually change PD-ID cause less disruption to micro-architectural caches. FIG. 10 shows a switch from the source software portion 406 running in protection domain A 404 to the destination software portion 408 running in protection domain B 404. Switch gates are read in the caller's protection domain, e.g., the destination software portion switch gate 406b (FIG. 10) is only read by calls originating within the source software portion 406.

In some embodiments, cross-domain calls require modifications to hardware. For example, in a system where each instruction is checked for the presence of a gate, the instruction cache 27 (FIG. 1) can include an additional "gate-present" bit, as described in conjunction with FIG. 1, indicating that an instruction address has a gate. If this bit is clear, indicating that no gate is associated with the present instruction address, then no further action needs to be taken on a GLB miss. If the bit is set, indicating that a gate is associated with the present instruction address, and the GLB 22 (FIG. 1) misses, the GLB 22 must be re-filled from the gate table 36 (FIG. 1). If the bit is set and there is a hit in the GLB 22, gate values stored in the GLB 22 are retrieved and used.

Cross-domain calls can be fast because the number of on-chip states that needs to be changed is small during the cross-domain calls. CPU designers can also further accelerate cross-domain calls to enable the benefits of protected execution. For example, traditional CPU micro-architectures flush pipelines on a context switch, imposing a large overhead. In one particular embodiment, protection domain switches can be made considerably faster by associating PD-ID values with each instruction in the pipeline, reducing the need to flush the pipeline.

Figure 12:
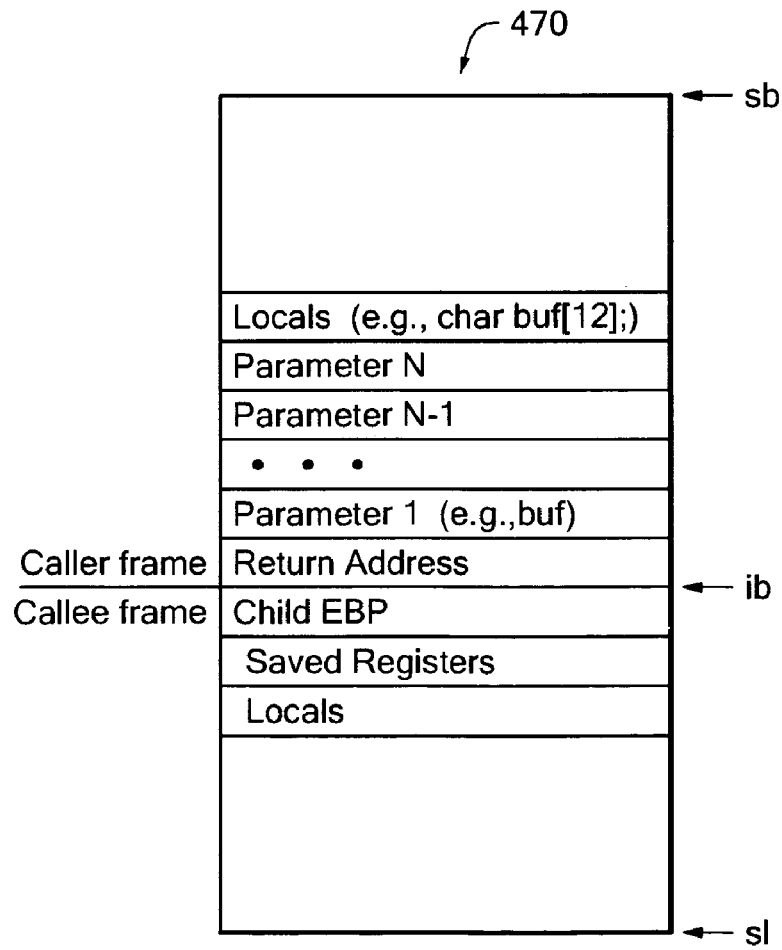
FIG. 12 is a diagram illustrating operation of stack frame registers, shown in FIG. 1.

Referring now to FIG. 12, a stack memory has partitions identified by addresses sb, fl, and sl, held in corresponding stack frame registers 28 (FIG. 1). A stack region between sb and fb addresses is read-only and a stack region between sb and fb addresses is read-write. The above-described source software portion, i.e., the caller, uses the caller frame between sb and fb addresses and the above-described destination software portion, i.e., the callee, uses the callee frame between fb and sl addresses.

Establishing an activation frame, i.e., the stack memory region between addresses, fb and sl, can be fast, and the permissions for reading and writing in frame can be local to the currently executing thread.

When the kernel schedules a process, it calls the memory supervisor 42 (FIG. 1) to activate the stack for that process, i.e., to generate an activation frame between addresses, fb and sl. The memory supervisor 42 also places the fb and sl addresses, in the corresponding stack frame registers 28b, 28c (FIG. 1). These registers demarcate a read-write region for the currently executing thread. The hardware allows reads and writes to addresses between sl and fb (stacks grow down so sl>fb). The fb address points to the base of the current activation frame. The memory supervisor 42 manages the save and restore of the stack frame registers 28. The memory supervisor 42 allocates the stack for a given thread, so it can initialize the sl register and validate the fb register.

As described above, on a cross-domain call, the CPU 12 (FIG. 1) saves the current value of the fb addresses to the cross-domain call stack 32 (FIG. 1), and it copies the current stack pointer into the fb register 28b (FIG. 1). The CPU 12 also checks that the new fb address is smaller than the old fb addresses, insuring that on cross-domain calls, fb grows down, but not below the sl address. The memory supervisor 42 insures that when a thread starts executing, the fb register 28b points within the stack memory for that thread. Since cross-domain returns can only set the fb register 28b to a value that was checked by either the memory supervisor 42 or the CPU 12, these mechanisms ensure that the fb register 26b always points within stack memory.

The memory supervisor 42 uses the sb register to mark the region between the fb and sb addresses with read-only permissions. The sb register is not necessary, because the fb and sl addresses provide a read-writable frame. However checking a table is more complicated than checking the base and bounds of two registers, so the sb register provides a useful optimization. The memory supervisor 42 (FIG. 1) initializes the sb register using its knowledge of the size and location of the stack. The supervisor saves and restores the sb register along with fb and sl registers specific to a given thread.

The stack permissions table 38 (FIG. 1) is a thread-local table (not a domain-local table), which allows a thread to pass permissions to successive frames of stack memory, independent of the domain in which a thread executes.

If a called function, i.e. the destination, needs an activation frame, it must request permissions for the stack space, and also make sure that permissions for the frame are exclusive to the current thread. Because protection domains take exclusive access to a frame before executing in the frame, a frame's permissions do not need to be revoked at the end of a function for the caller's safety. A callee that is concerned about security could overwrite its activation frame before returning to avoid leaking information.

Calls to establish a stack frame will be frequent and could potentially be expensive. Stack frame registers 24 described in conjunction with FIG. 1 can make the creation of a frame fast, and can make permissions to read and write the frame thread-local.

When the memory supervisor (e.g., 42, FIG. 1) makes a stack frame current, it can fill the frame base register, fb 28b (FIG. 1), and the stack limit register, sl 28c (FIG. 1). As described above, reads and writes are allowed to addresses between sl and fb (stacks grow down). The value in the fb register points to the base of the current activation frame. Its initial value for a given thread's quantum is specified when a thread manager starts the thread. The memory supervisor 42 verifies the initial value in the fb register 28b to make sure it is within the stack segment that is being activated. On a cross-domain call, in one particular embodiment, the current value of the fb register 28b can be pushed onto the cross-domain call stack 32 (FIG. 1) as shown also in FIGS. 10-10C, and the current stack pointer is made the new value of the fb register 28b. The system 10 (FIG. 1) checks that the new value of the fb register 28b is smaller than the old value. Thus the system 10 assures that the stack grows down, and the memory supervisor 42 assures that it starts and ends at the correct location, so the fb register 28b and the sl register 28b can only be used to gain permission to read and write stack memory. The registers become part of the thread state, which must be saved and restored.

Heap data is owned by a protection domain, so cross-domain sharing of heap data can be accomplished when the caller exports permissions to the callee. Protection domains can set up shared buffers in advance of a cross-domain call. In a producer-consumer relationship, the producer would maintain read-write access on a buffer and flag value, while the consumer has read-only access on the buffer and read-write access on the flag. Once the permissions are established, they do not need to be modified for every call.

Figure 13:
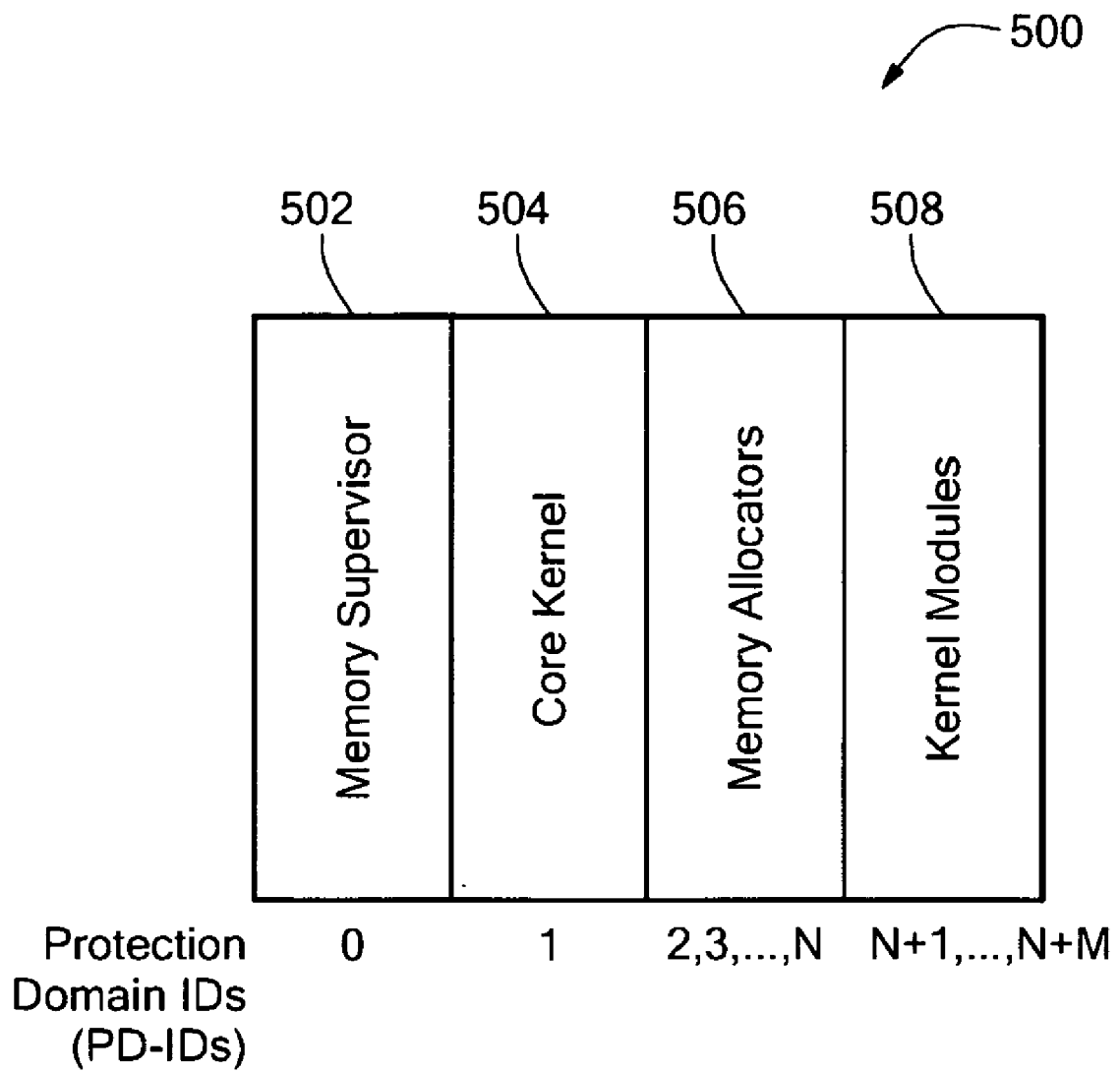
FIG. 13 is a diagram illustrating memory supervisor and kernel protection domains.

Referring now to FIG. 13, a chart 500 shows how a kernel address space can be split into multiple protection domains 0–N+M. The protection domain (PD-ID 0) is associated with memory supervisor 502, which can be same as or similar to the memory supervisor 42 of FIG. 1. As described above, the memory supervisor 42 manages the permissions table 40 (FIG. 1) and provides an application programming interface (API) to control memory permissions. Functions of the memory supervisor 42 and memory supervisor API are described by example below, by showing how it would be used during the boot of a modularized kernel.

At system reset, the CPU (e.g., CPU 12, FIG. 1) starts running at an instruction reset vector in PD-ID 0 and a BIOS loads the memory supervisor 42 into physical memory (e.g., memory 40 of FIG. 1) and transfers control to it, letting it know how much physical memory is present. The memory supervisor 42 establishes a handler for hardware permission faults.

In operation, the system 10 (FIG. 1) checks all processor memory accesses against permission values stored in the permissions table 40 associated with the current protection domain (except those associated with protection domain 0). The memory supervisor 42 can enforce additional memory usage policies because all calls for permission changes are made via the memory supervisor 42. The memory supervisor 42 can reject requests that violate its policy. Just because the memory supervisor exports an API does not mean that all protection domains have permissions to call into it. It is possible to construct a protection domain, which does not have permission to call into the memory supervisor, forcing memory management to happen via another protection domain.

To this end, the memory supervisor 42 can track protection domain ownership of memory regions in the memory 30 (FIG. 1). A protection domain can obtain ownership of a memory region from the memory supervisor 42 after the memory supervisor 42 allocates a new memory region, or when another protection domain grants ownership of a region. Only software running in a protection domain, which is the owner of a memory region, can grant ownership or revoke permissions associated with the memory region to another protection domain.

Once initialized, the memory supervisor 42 can create a new protection domain (PD-ID 1) to hold code and data for the core of the kernel 502. The memory supervisor 42 does not allow a user protection domain to create a kernel protection domain.

To start the kernel, the memory supervisor 42 first loads a boot loader, which runs in protection domain PD-ID 1. Initially, the boot loader has no permissions to access the memory 30 (FIG. 1). In order for the boot loader to run, it needs to execute permission on its code, read and write permissions on its data, a read-write stack, and possibly a read-write heap. The memory supervisor 42 can provide a software function to establish proper permissions for boot loader execution. The memory supervisor 42 can then perform a cross-domain call (described above) to transfer control to the boot loader, which now runs in a protected kernel protection domain (PD-ID 1).

The boot loader wants to load the core kernel, and therefore, can make a call to a software function of the memory supervisor 42 for allocation of additional memory space. The memory supervisor 42 allocates a region of memory and returns a pointer. The memory supervisor 42 records PD-ID 1 as the owner of this memory region. The owner of a region can call yet another software function of the memory supervisor 42 to release a memory region back to the memory supervisor 42.

Once the core kernel starts running, it can create child protection domains N+1 to M+1 in which kernel modules can run. The core kernel can export permissions for portions of its address space to its child modules using other called software functions, and it can also pass ownership of memory regions to kernel modules to allow them to manage the permissions of their children. A kernel module can directly request the memory supervisor 42 to allocate memory regions. Also, the core kernel can manage memory usage of its modules. The core kernel can block kernel modules from calling the memory supervisor 42 by not exporting call permission on the memory supervisor entry points to the kernel modules.

Destination software running in a destination protection domain can transitively export permissions. This allows software running in a calling protection domain to either enforce a policy of only allowing a particular destination software running in a particular destination protection domain (perhaps one containing cryptographically verified code) to implement a function, or allowing the particular destination software running in a particular destination protection domain to subcontract work to other destination software running in other destination protection domains. Transitive permissions are still distinct from ownership because only the owner can return memory to protection domain 0, and a protection domain that receives transitive permissions cannot revoke permissions from a protection domain higher on the receiving chain.

Protection domains can be created hierarchically, and they can be destroyed hierarchically. The memory supervisor 42 tracks the entire protection domain hierarchy.

A special case for sharing data is global read-only access, allowing export of data to all protection domains as read-only. When a piece of the memory 30 (FIG. 1) is exported globally, the memory supervisor 42 adds the corresponding permissions to all existing protection domains. The memory supervisor 42 also tracks the global export in the protection domains so it can add permissions for this globally exported memory to new protection domains as they are created.

Code and heap data regions can be associated with a protection domain, and are typically owned by one protection domain and exported to others. The stack 34 (FIG. 1) can be managed differently, however, because stacks are used by threads that move between protection domains. In one particular embodiment, the stack 34 is owned by the memory supervisor 42 (FIG. 1). To acquire allocation of space in the stack 34, a thread manager in a protection domain calls a memory supervisor function.

The memory supervisor 42 only owns and manages the stack space for each thread. Other details about the thread, like its control block and the scheduling policy that govern it, are determined by the kernel or an arbitrary thread-managing protection domain.

Stack permissions are managed and allocated by the memory supervisor 42, which can make a permissions change on memory that it owns. Of course, the memory supervisor range checks a requested address and refuses action if the request is inappropriate.

When a stack segment is allocated, the memory supervisor 42 records the creating protection domain and a stack-ID, which is just the base address of the stack segment. When a thread is scheduled, a thread manager must call to the memory supervisor to tell it that a certain stack is now active. The memory supervisor checks that the thread manager has permission to make the stack segment active. When the memory supervisor receives a call to set stack permissions, it checks that the request is for the active stack.

While the memory supervisor 42 is shown to be associated with one protection domain, PD-ID 0, in another embodiment, to provide greater robustness and to reduce the size of the trusted code associated with PD-ID 0, the memory supervisor 42 can be associated with two or more protection domains. In this embodiment, protection domain 0, PD-ID 0, which provides unfettered access to all of the memory 30 (FIG. 1), only provides permission portions of the memory supervisor 42 that manage hardware and write to the permissions tables 38, 40 (FIG. 1). Memory supervisor entry points and complex permissions policy management code can be in protection domain 1, PD-ID 1.

It should be appreciated that FIGS. 14-18A show flowcharts corresponding to the below contemplated technique which would be implemented in computer system 10 (FIG. 1). The rectangular elements (typified by element 602 in FIG. 14), herein denoted "processing blocks," represent computer software instructions or groups of instructions. The diamond shaped elements (typified by element 710 in FIG. 16) herein denoted "decision blocks," represent computer software instructions, or groups of instructions, which affect the execution of the computer software instructions, represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 14:
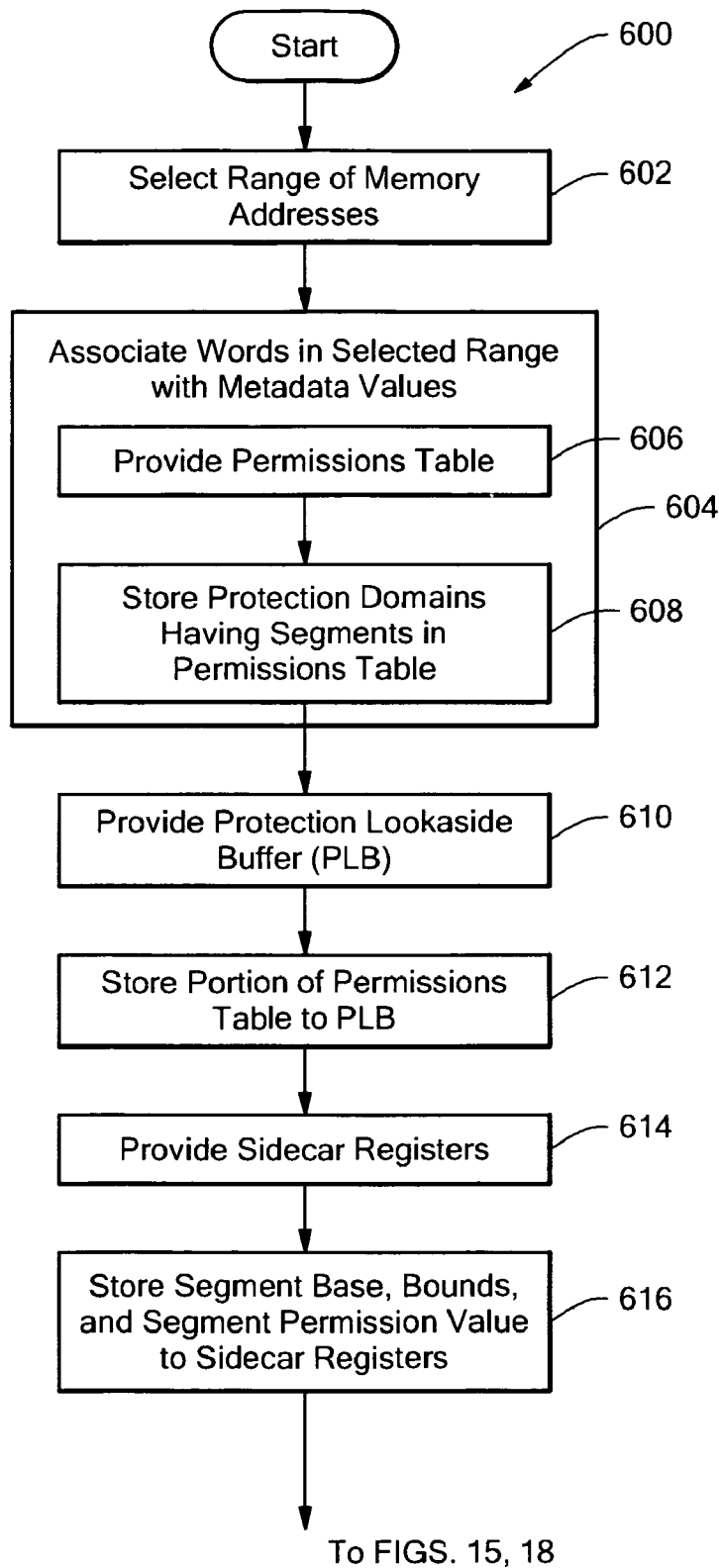
FIG. 14 is a flow chart showing a method associated with the permissions table and the sidecar registers in accordance with the permissions table and sidecar registers shown in FIG. 1.

Referring now to FIG. 14, a method 602 for providing a permission table, a protection lookaside buffer, and sidecar registers, begins at block 602, where a range of memory addresses is selected. The PLB can be the same as or similar to the PLB 18 of FIG. 1 and the sidecar registers can be the same as or similar to the sidecar registers of 16 of FIG. 1. In one particular embodiment, the selected address range is the full address range of physical memory. In another particular embodiment, the selected address range is the full address range of virtual memory. In other embodiments, the selected address range is a portion of the address range of virtual or physical memory.

At block 604, words in the selected range of addresses identified at block 602 are associated with metadata values. Metadata values and associated permission values are described above in conjunction with FIG. 1. The association provided in block 604 includes providing a permission table in block 606 and storing protection domains in the permission table at block 608, each protection domain having one or more segments. The permissions table can be the same as or similar to the permissions table 40 of FIG. 1.

At block 610, a protection lookaside buffer (PLB) is provided, which is filled at block 612 with entries from the permission table. At block 614 one or more sidecar registers are provided, which are filled at block 616 with segment information, including, but not limited to, a segment address base, a segment address range, and a permission value. The PLB can be the same as or similar to the PLB 18 of FIG. 1 and the sidecar registers can be the same as or similar to the sidecar registers of 1b of FIG. 1.

Figure 15:
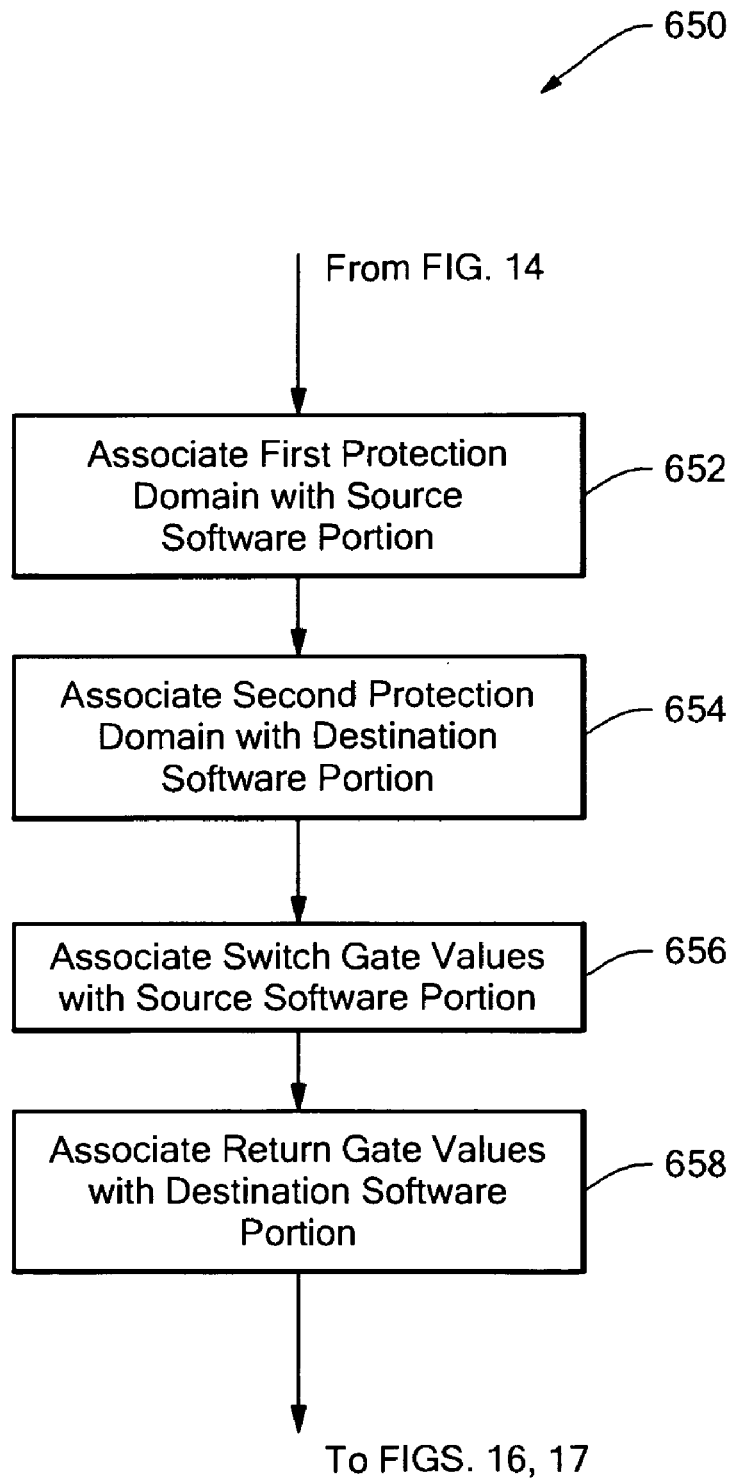
FIG. 15 is a flow chart showing a method associated with software cross-domain calls.

Referring now to FIG. 15, a process 650 for associating protection domains with software portions begins at block 652, where a first protection domain is associated with a source software portion. At block 654, a second protection domain is associated with a destination software portion. It will be understood from discussion in conjunction with FIGS. 10-10C, that the source software portion and the destination software portion can correspond, for example, to a source of a software call and a destination of a software call, respectively.

At block 656, switch gate values are associated with the source software portion, and in particular, to one or more instructions addresses within the source software portion. At block 658, return gate values are associated with the destination software portion, and in particular, to one or more instructions addresses within the destination software portion.

Figure 16:
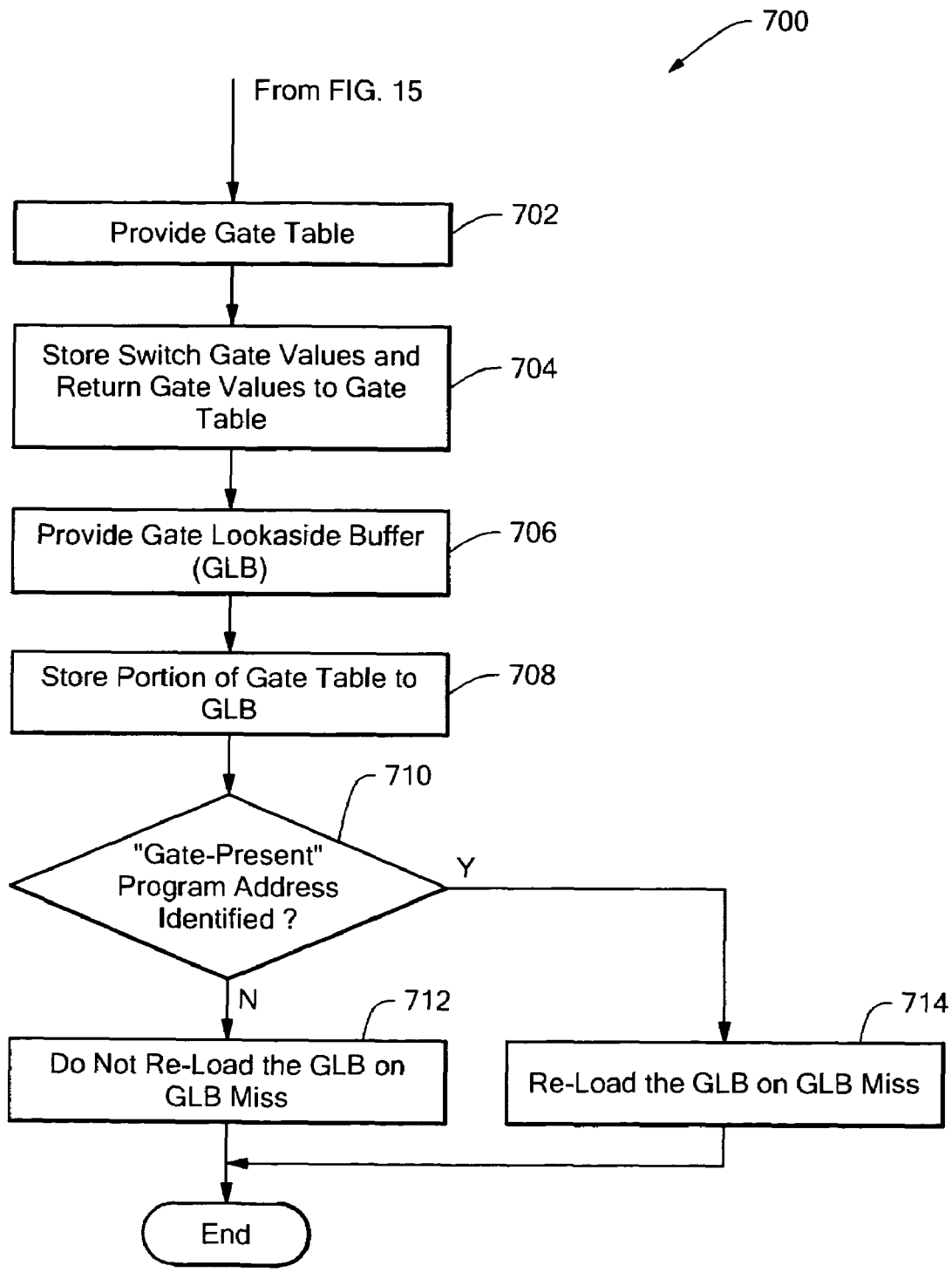
FIG. 16 is a flow chart showing a method associated with software cross-domain calls in accordance with a gate table and a gate lookaside buffer shown in FIG. 1.

Referring now to FIG. 16, a method 700 for providing a gate table and a gate lookaside buffer begins at block 702 where a gate table is provided. The gate table, gate lookaside buffer can be the same as or similar to the gate table 36 and the gate lookaside buffer 22 of FIG. 1.

At block 704, switch gate values and return gate values are stored to the gate table. At block 706, the gate lookaside buffer is provided. At block 708, a portion of the gate table is stored to the gate lookaside buffer.

At decision block 710, during program execution, an instruction is examined to identify if the program address associated with the instruction has a gate. This examination is described above in conjunction with FIG. 1, and can involve discovery of the gate-present bit in the instruction cache 27 (FIG. 1).

If, at block 710, the gate-present bit is not discovered, then upon a GLB miss, at block 712, the GLB 22 is not re-loaded from the gate table 36. If, however, at block 710, the gate-present bit is discovered, then upon a GLB miss, at block 714, the GLB 22 is re-loaded from the gate table 36.

Figure 17:
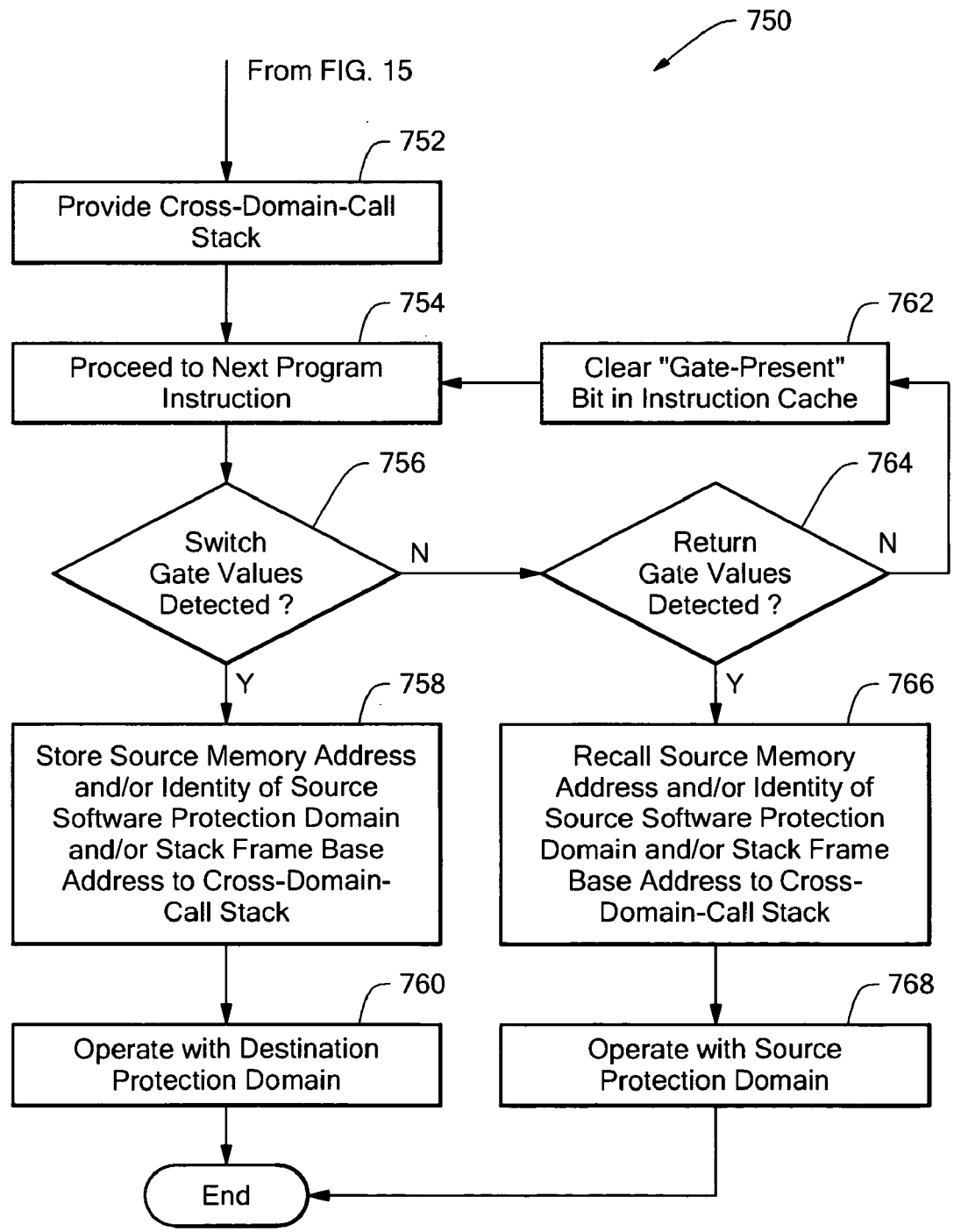
FIG. 17 is a flow chart showing a method associated with software cross-domain calls in accordance with a cross-domain call stack shown in FIG. 1.

Referring now to FIG. 17, a method 750 for providing a cross-domain call as described above in conjunction with FIGS. 10-10C, begins at block 752, where a cross-domain call stack is provided. The cross-domain call stack can be the same as or similar to the cross-domain call stack 32 of FIG. 1.

At block 754, a program proceed to a next instruction, and at decision block 756, the instruction is examined to identify whether a switch gate having switch gate values is detected in association with the instruction. If at block 756, switch gate values are detected, then the process proceeds to block 758, where a variety of data are stored, for example to the cross-domain call stack provided at block 752. For example, one or more of a source software portion memory address, a PD ID associated with the source software portion, and a stack frame base address (e.g., 28b, FIG. 1) can be stored. The software then operates at block 760 in accordance with a destination protection domain associated with the destination software portion, wherein the destination protection domain is identified form the switch gate values detected at block 756.

If at block 756, switch gate values are not detected, the process proceeds to decision block 764, where the instruction reached at block 754 is examined to identify whether a return gate having return gate values is detected in association with the instruction. If at block 764, return gate values are detected, then the process proceeds to block 766, where a variety of data are recalled, for example from the cross-domain call stack provided at block 752. For example, one or more of a source software portion memory address, the PD ID associated with the source software portion, and the stack frame base address (e.g., 26a, FIG. 1) can be recalled. The software then operates at block 768 in accordance with a source protection domain associated with the source software portion.

Figure 18:
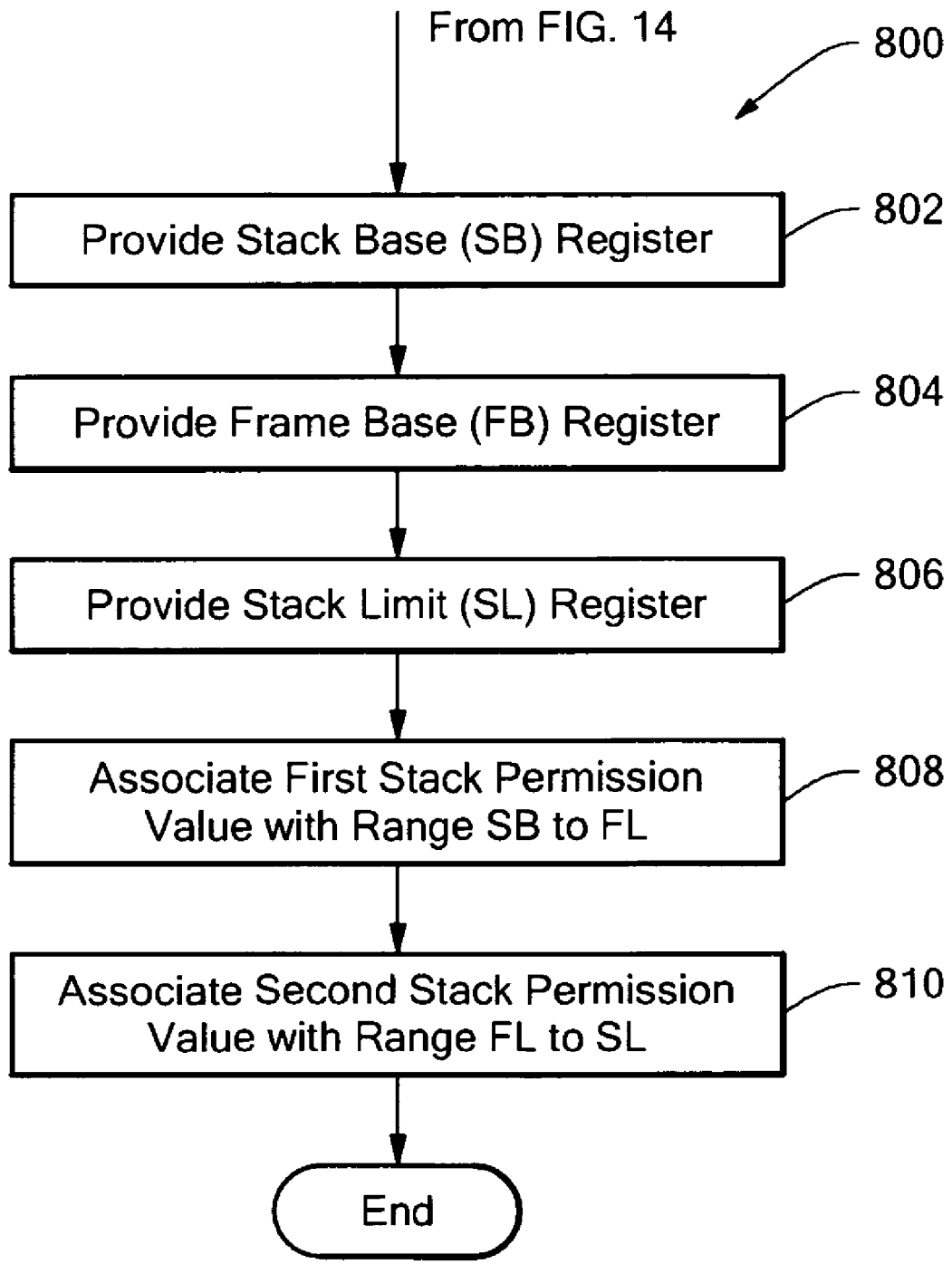
FIG. 18 is a flow chart showing a method in accordance with stack permissions associated with stack frame registers shown in FIG. 1.

Referring now to FIG. 18, a process 800 for providing stack permissions begins at block 802, where a stack base, sb, register is provided. A frame base, fb, register is provided at block 804 and a stack limit, sl, register is provided at block 806. The sb, fb, and sl registers can be the same as or similar to the stack frame registers 28 of FIG. 1.

At block 808, a first stack permission value is associated with the stack range provided by addresses in the sb and fb registers. In one particular embodiment, the first stack permission value is read-only.

At block 810, a second stack permission value is associated with the stack range provided by addresses in the fb and sl registers. In one particular embodiment, the second stack permission value is read-write.

Figure 18A:
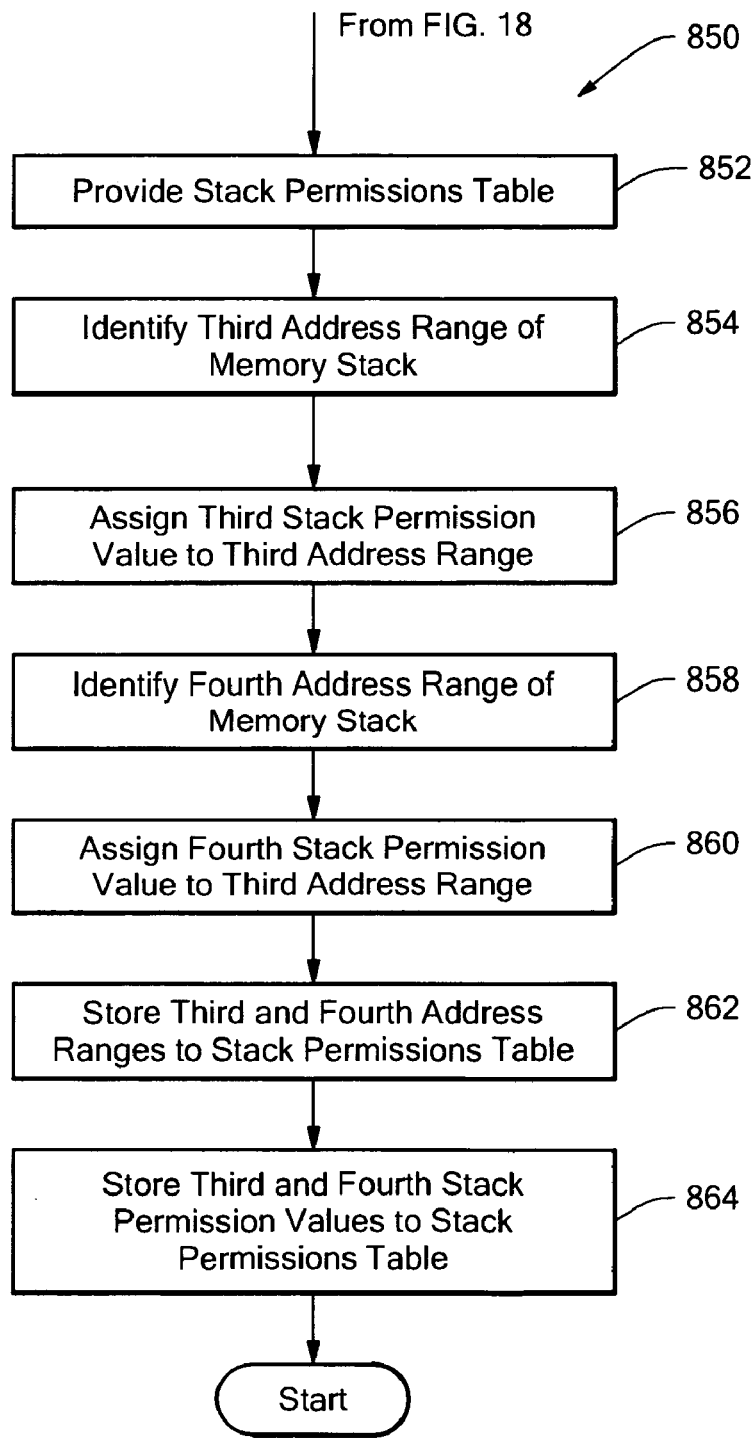
FIG. 18A is a flow chart showing a method in accordance with a stack permissions table shown in FIG. 1.

Referring now to FIG. 18A, another process 850 for providing stack permissions begins at block 852, where a stack permission table is provided. The stack permission table can be the same as or similar to the stack permissions table 38 of FIG. 1. At block 854, a third address range of the memory stack is identified and at block 856, a third stack permission value is assigned to the third address range of the stack.

At block 858, a fourth address range of the memory stack is identified and at block 860, a fourth stack permission value is assigned to the fourth address range of the stack. At blocks 862 and 864, the third and fourth address ranges and the third and fourth stack permission values are stored, for example to the stack permissions table 36.

Any address within the stack 34 (FIG. 1) can be associated with the first or second stack permission value as provided in FIG. 18 and also with the third or fourth permission value as provided in FIG. 18A. In one particular embodiment, if either of the stack permission values associated with an address within the stack 34 allows access, then the address can be accessed by the currently running thread.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

The invention claimed is:

1. A method of protecting contents of a computer memory used in a computer having a central processing unit (CPU) in communication with one or more address registers, the method comprising:
    selecting a range of memory addresses within the computer memory; and
    generating one or more protection domains, the one or more protection domains comprising an association of each word in the range of memory addresses with a respective metadata value, wherein a selected word in the range of memory addresses is associated with a first metadata value and words adjacent to the selected word are associated with second and third metadata values respectively, wherein each one of the metadata values comprises a respective permission value, wherein generating the one or more protection domains comprises:
        providing a permissions table; and
        storing to the permissions table the one or more protection domains, wherein each one of the one or more protection domains is associated with the range of memory addresses, wherein each one of the one or more protection domains has a respective one or more segments, each one of the one or more segments forming a portion of the range of memory addresses, wherein each one of the one or more segments is associated with a respective one of the metadata values.

2. The method of claim 1, wherein selected ones of the permission values are selected from among a read-only value, a write-only value, a read-write value, an execute-read value, an execute-write value, an execute-read-write value, an execute-only value, or a no-permission value.

3. The method of claim 1, wherein selected ones of the metadata values further comprise at least one of a respective cache coherence state value, a not-cached state value, a cached-exclusive state value, a cached-modified state value, or a cached-shared state value.

4. The method of claim 1, wherein selected ones of the metadata values further comprise at least one of a cache coherence state value, a not-cached state value, a cached-exclusive state value, a cached-modified state value, or a cached-shared state value.

5. The method of claim 1, further comprising assigning one of the one or more protection domains to a software module.

6. The method of claim 1, further comprising assigning one of the one or more protection domains to a software kernel.

7. The method of claim 1, wherein at least one of the one or more protection domains is generated upon a request by a software module.

8. The method of claim 1, wherein at least one of the one or more protection domains is generated upon a request by a software kernel.

9. The method of claim 1, wherein each of the one or more protection domains is associated with a respective protection domain identifier (PD-ID).

10. The method of claim 1, wherein the permissions table comprises a sorted segment table having the one or more segments, each one of the one or more segments identified by a respective one or more starting address, each of the one or more starting addresses corresponding to a base address of a respective one of the one or more segments.

11. The method of claim 1, wherein the permissions table comprises a multi-level permissions table including an address having a trie structure having one or more address portions arranged in a hierarchical structure, each of the one or more address portions pointing to a respective one or more entries in the permissions table selected from among a pointer to another permissions table entry and an entry having at least one permission value.

12. The method of claim 1, wherein the entry having at least one permission value is a mini-sorted-segment table (mini-SST) entry having a plurality of address offsets and a respective plurality of permission values.

13. The method of claim 1, further including:
    providing a protection lookaside buffer (PLB); and
    loading at least a portion of the permissions table in the protection lookaside buffer (PLB).

14. The method of claim 13, further including re-loading the PLB with another permissions table portion when an address request to the PLB does not find a desired address.

15. The method of claim 1, further including:
    providing at least one sidecar register associated with a respective at least one of the one or more address registers; and
    loading the at least one sidecar register with an address base and an address bounds corresponding to one of the one or more segments within the permissions table and with a permission value associated with the one of the one or more segments.

16. The method of claim 15, further including re-loading the at least one sidecar register with another address range corresponding to another one of the one or more segments within the permissions table and with an associated permission value when an address request to the sidecar register does not find a desired address.

17. The method of claim 15, further including
    providing a protection lookaside buffer (PLB); and
    loading at least a portion of the permissions table in the protection lookaside buffer (PLB); and
    re-loading the at least one sidecar register with another address range corresponding to another one of the one or more segments within the permissions table and with an associated permission value when an address request to the sidecar register does not find a desired address.

18. The method of claim 1, further including:
    associating a first one of the one or more protection domains with a source software portion and a second one of the one or more protection domains with a destination software portion;
    associating a switch gate having switch gate values with the source software portion, the switch gate associated with a software call from the source software portion to the destination software portion, the switch gate values including a source address associated with the source software portion, a switch gate identifier value, and a protection domain identifier associated with the second one of the one or more protection domains; and
    associating a return gate having return gate values with the destination software portion, the return gate associated with the software call from the source software portion, wherein the return gate values include a destination address associated with the destination software portion, or a return gate identifier value.

19. The method of claim 18, further including:
providing a gate table; and
storing the switch gate values and the return gate values in the gate table.

20. The method of claim 19, further including:
providing a gate lookaside buffer; and
loading at least a portion of the gate table in the gate lookaside buffer (GLB).

21. The method of claim 20, further including re-loading the GLB with another at least a portion of the gate table when an address request to the GLB does not find a desired address.

22. The method of claim 20, further including:
identifying a gate-present program address associated with the switch gate values and the return gate values; and
not re-loading the GLB when an address request to the GLB does not find a desired address and the address request does not correspond to the gate-present program address.

23. The method of claim 18, further including:
providing a cross-domain-call stack;
storing an identity of the first one of the one or more protection domains associated with the source software portion onto the cross-domain-call stack upon detecting the switch gate values, wherein the software operates during the software call in accordance with the second one of the one or more protection domains associated with the destination software portion; and
recalling the identity of the first one of the one or more protection domains associated with the source software portion upon detecting the return gate values, wherein the software operates after the software return in accordance with the first one of the one or more protection domain associated with the source software portion.

24. The method of claim 23, further including:
storing a source software portion address onto the cross-domain call stack upon detecting the switch gate values;
recalling the source software portion address from the cross domain call stack upon detecting the return gate values; and
checking validity of the recalled source software portion address.

25. The method of claim 24, further including:
storing a stack frame of base address onto the cross-domain call stack associated with an address of a frame a stack memory; and
recalling the stack frame base address from the cross-domain call stack.

26. The method of claim 1, further including:
providing a stack base (sb) register for storing a stack base address corresponding to a base address of a stack memory;
providing a frame base (fb) register for storing a frame base address corresponding to an intermediate address within an address range of the stack memory;
providing a stack limit (sl) register for storing a stack lower address corresponding to a terminating address of the stack memory;
associating a first stack permission value with a stack address range from the stack base address to the frame base address; and associating a second stack permission value with a stack address range from the frame base address to the stack limit address; wherein the stack base address, the frame base address and the stack lower address are dynamically updated during a software call.

27. The method of claim 26, further including:
providing a stack permissions table,
identifying a third stack address range;
assigning a third stack permission value to the third stack address range;
identifying a fourth stack address range;
assigning a fourth stack permission value to the fourth stack address range; and
storing in the stack permissions table:
the third and fourth stack address ranges, and
the third and fourth stack permission values.

28. The method of claim 27, further including:
selecting an address within the stack memory;
operating upon the selected address within the stack memory in accordance with a selected one of the first, second, third, or fourth stack permission values when the selected address range falls within the first, second, third, and fourth stack address ranges, respectively.

29. The computer apparatus of claim 1, wherein selected ones of the permission values are selected from among a write-only value, read-write value, execute-read value, an execute-write value, an execute-read-write value, or an execute-only value.

30. A computer apparatus having a central processing unit (CPU), the computer apparatus comprising:
a computer memory coupled to the CPU having a range of memory addresses addressable by the CPU; and
one or more protection domains, the one or more protection domains comprising an association of each word in the range of memory addresses with a respective metadata value, wherein a selected word in the range of memory addresses is associated with a first metadata value and words adjacent to the selected word are associated with second and third metadata values respectively, wherein each one of the metadata values comprises a respective permission value, wherein the one or more protection domains are arranged in a permissions table stored in the computer memory, wherein each of the one or more protection domains is associated with the range of memory addresses, wherein each one of the one or more protection domains has a respective one or more segments, each one of the one or more segments forming a portion of the range of memory addresses, wherein each one of the one or more segments is associated with a respective one of the metadata values.

31. The computer apparatus of claim 30, wherein selected ones of the permission values are selected from among a read-only value, write-only value, read-write value, execute-read value, an execute-write value, an execute-read-write value, an execute-only value, or a no-permission value.

32. The computer apparatus of claim 30, wherein selected ones of the metadata values further comprises at least one of a cache coherence state value, a not-cached state value, a cached-exclusive state value, a cached-modified state value, or a cached-shared state value.

33. The method of claim 30, wherein selected ones of the metadata values further comprise at least one of a respective cache coherence state value, a not-cached state value, a cached-exclusive state value, a cached-modified state value, or a cached-shared state value.

34. The computer apparatus of claim 30, wherein each one of the one or more protection domains are assigned to one of a software kernel, a software module, or a computer stack, and the one of the software kernel, the software module, or the computer stack operates in accordance with the assigned protection domain.

35. The computer apparatus of claim 30, further including a protection domain identifier (PD-ID) register for storing a protection domain identifier value associated with at least one of the one or more protection domains.

36. The computer apparatus of claim 30, further including a memory supervisor, for receiving a request to invoke and impose a requested protection domain and for accepting or denying the request.

37. The computer apparatus of claim 30, further including a permissions table base register in communication with the CPU for storing a base address of the permissions table.

38. The computer apparatus of claim 30, further including a protection lookaside buffer (PLB) in communication with the permissions table for storing at least a portion of the permissions table.

39. The computer apparatus of claim 30, further including at least one sidecar register associated with a respective at least one of the one or more address registers, wherein the at least one sidecar register includes a respective segment address range and a respective permission value associated with the segment address range.

40. The computer apparatus of claim 30, further including a gate table for storing switch gate values and return gate values associated with a software call from a source software portion to a destination software portion, the switch gate values including a source address associated with the source software portion, a switch gate identifier value, and a protection domain identifier associated with the destination software portion, and the return gate values including a destination address associated with the destination software portion, and a return gate identifier value.

41. The computer apparatus of claim 40, further including a gate lookaside buffer for storing at least a portion of the gate table.

42. The computer apparatus of claim 40, further including a cross-domain-call stack for storing an identity of a protection domain associated with the source software portion onto the cross-domain-call stack upon detecting the switch gate values, wherein the software operates during the software call in accordance with a protection domain associated with the destination software portion, and for recalling the identity of the protection domain associated with the source software portion upon detecting the return gate values, wherein the software operates after the software return in accordance with the protection domain associated with the source software portion.

43. The computer apparatus of claim 30, further including a stack permissions table for storing at least one stack permission value associated with a selected address range of a computer stack, wherein the CPU operates in accordance with the at least one stack permission value when accessing a portion of the memory stack within the selected address range.

44. The computer apparatus of claim 30, further including an instruction cache coupled to the central processing unit, the instruction cache having computer instructions stored therein and also having gate-present bits associated with one or more of the computer instructions, the gate-present bits indicative of selected ones of a switch gate and a return gate associated with respective ones of the one or more computer instructions.

45. The method of claim 1, wherein selected ones of the permission values are selected from among a write-only value, a read-write value, an execute-read value, an execute-write value, an execute-read-write value, or an execute-only value.

* * * * *

UNITED STATES PATENT AND TRADEMARK OFFICE
CERTIFICATE OF CORRECTION

PATENT NO.       : 7,287,140 B1
APPLICATION NO.  : 10/899776
DATED            : October 23, 2007
INVENTOR(S)      : Asanovic et al.

It is certified that error appears in the above-identified patent and that said Letters Patent is hereby corrected as shown below:

Column 5, lines 35-36 delete "instances software" and replace with --instances, software--.

Column 5, lines 37-38 delete "instances non-conventional" and replace with --instances, non-conventional--.

Column 7, line 11 delete ". Let is" and replace with --. Let it--.

Column 7, line 11 delete "registers" and replace with --register--.

Column 9, line 31 delete "instruction" and replace with --instructions--.

Column 10, lines 61-62 delete "embodiments," and replace with --embodiment,--.

Column 11, line 50 delete "register 26c)" and replace with --register 26c).--.

Column 12, line 25 delete "can be a virtual memory addresses" and replace with --can be virtual memory addresses--.

Column 12, line 57 delete "memory regions 52a-52l is" and replace with --memory regions 52a-52j is--.

Column 13, line 11 delete "programs." and replace with --program.--.

Column 14, line 14 delete "permission stable 40" and replace with --permissions table 40--.

Column 14, line 27 delete "permission table 40." and replace with --permissions table 40.--.

Column 14, line 42 delete "level third tables" and replace with --third level tables--.

Column 14, line 45 delete "let is" and replace with --let it--.

Column 15, line 64 delete "segment base" and replace with --segment based--.

Column 16, line 4 delete "permission table entries 202, 204" and replace with --permissions table entries 202, 204--.

UNITED STATES PATENT AND TRADEMARK OFFICE
CERTIFICATE OF CORRECTION

| | |
|---|---|
| PATENT NO. | : 7,287,140 B1 |
| APPLICATION NO. | : 10/899776 |
| DATED | : October 23, 2007 |
| INVENTOR(S) | : Asanovic et al. |

It is certified that error appears in the above-identified patent and that said Letters Patent is hereby corrected as shown below:

Column 17, line 30 delete "sixteen sub-block" and replace with --sixteen sub-blocks--.

Column 18, line 10 delete "form" and replace with --from--.

Column 18, line 28 delete "0X1040–X107F" and replace with --0X1040–0X107F--.

Column 18, line 54 delete "bound" and replace with --bounds--.

Column 20, line 41 delete "second state." and replace with --second state 410d.--.

Column 21, line 50 delete "can have has its" and replace with --can have its--.

Column 22, line 46 delete "needs" and replace with --need--.

Column 23, line 30 delete "However" and replace with --However,--.

Column 26, line 60 delete "stated the" and replace with --stated, the--.

Column 27, line 1 delete "sidecar registers of 16" and replace with --sidecar registers 16--.

Column 27, line 12 delete "permission" and replace with --permissions--.

Column 27, line 19 delete "permission table. At block 614 one" and replace with --permissions table. At block 614, one--.

UNITED STATES PATENT AND TRADEMARK OFFICE
CERTIFICATE OF CORRECTION

PATENT NO. : 7,287,140 B1
APPLICATION NO. : 10/899776
DATED : October 23, 2007
INVENTOR(S) : Asanovic et al.

It is certified that error appears in the above-identified patent and that said Letters Patent is hereby corrected as shown below:

Column 28, line 4 delete "proceed" and replace with --proceeds--.

Column 28, line 17 delete "form" and replace with --from--.

Column 31, line 39 delete "domain" and replace with --domains--.

Signed and Sealed this

Fifteenth Day of April, 2008

JON W. DUDAS
*Director of the United States Patent and Trademark Office*